US012586739B2

(12) United States Patent
Askan

(10) Patent No.: US 12,586,739 B2
(45) Date of Patent: Mar. 24, 2026

(54) HYBRID CIRCUIT BREAKER WITH IMPROVED CURRENT CAPACITY PER DEVICE SIZE

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 634 days.

(21) Appl. No.: 17/626,507

(22) PCT Filed: Jul. 9, 2020

(86) PCT No.: PCT/EP2020/069370
§ 371 (c)(1),
(2) Date: Jan. 12, 2022

(87) PCT Pub. No.: WO2021/008993
PCT Pub. Date: Jan. 21, 2021

(65) Prior Publication Data
US 2022/0293354 A1 Sep. 15, 2022

(30) Foreign Application Priority Data
Jul. 16, 2019 (GB) ..................................... 1910176

(51) Int. Cl.
*H01H 9/52* (2006.01)
*H01H 1/62* (2006.01)
(Continued)

(52) U.S. Cl.
CPC ................ *H01H 9/52* (2013.01); *H01H 1/62* (2013.01); *H01H 9/542* (2013.01); *H02J 3/36* (2013.01); *H01H 2009/546* (2013.01)

(58) Field of Classification Search
CPC ......... H01H 2009/52; H01H 2009/523; H01H 2009/546; H01H 13/82; H01H 33/70;
(Continued)

(56) References Cited

U.S. PATENT DOCUMENTS 9,287,065 B1 3/2016 Davis et al.
9,947,496 B2 4/2018 Niehoff
(Continued)

FOREIGN PATENT DOCUMENTS

CN 1617281 A 5/2005
CN 103703534 A 4/2014
(Continued)

OTHER PUBLICATIONS

Electrical Engineering and Electrical Equipment [M], Edited by Zhejiang University and North China Institute of Water Resources and Hydropower, Water Conservancy Press, Jul. 1980, p. 286-288.
(Continued)

*Primary Examiner* — Anthony R Jimenez
(74) *Attorney, Agent, or Firm* — LEYDIG, VOIT & MAYER, LTD.

(57) ABSTRACT

A hybrid circuit breaker includes: input connectors configured to receive electrical energy from a power grid; output connectors configured to transfer electrical energy to a load; current paths, each connecting a respective input connector, of the input connectors, and a respective output connector, of the output connectors; an electro-mechanical bypass switch in at least one of the current paths; a semiconductor circuit in parallel with the electro-mechanical bypass switch; a controller configured to control a commutation from the current path in which the electro-mechanical bypass switch is arranged to the semiconductor circuit in a switching operation; and an active cooling device in a vicinity of the electro-mechanical bypass switch. The active cooling device
(Continued)

is adopted to cool movable parts of the electro-mechanical bypass switch.

17 Claims, 5 Drawing Sheets

(51) Int. Cl.

| | | |
|---|---|---|
| *H01H 9/54* | (2006.01) | |
| *H02J 3/36* | (2006.01) | |

(58) Field of Classification Search

CPC ...... H01H 33/7015; H01H 33/72; H01H 9/28; H01H 9/52; H01H 9/542; H01H 1/00; H01H 1/62; H01H 9/54; H02J 3/36

USPC ...................................... 200/289, 237, 43.11

See application file for complete search history.

(56) References Cited

U.S. PATENT DOCUMENTS

| | | | | |
|---|---|---|---|---|
| 10,734,835 | B2 * | 8/2020 | Kao ......................... | H02J 9/061 |
| 2002/0171986 | A1 * | 11/2002 | Figueroa ................. | H02B 1/56 |
| | | | | 361/93.1 |
| 2005/0146814 | A1 | 7/2005 | Sellier et al. | |
| 2014/0327990 | A1 | 11/2014 | Juricev | |
| 2015/0162783 | A1 * | 6/2015 | Kanayama ........... | B60L 53/305 |
| | | | | 307/66 |
| 2019/0190311 | A1 | 6/2019 | Kao et al. | |

FOREIGN PATENT DOCUMENTS

| | | | | | |
|---|---|---|---|---|---|
| CN | 208172575 | U | | 11/2018 | |
| CN | 109687413 | A | | 4/2019 | |
| CN | 109950966 | A | | 6/2019 | |
| CN | 111477522 | B | * | 11/2020 | |
| DE | 3617231 | A1 | | 11/1987 | |
| EP | 2750257 | B1 | | 7/2014 | |
| GB | 2283378 | A | * | 5/1995 | ........... H02H 7/0858 |
| GB | 2517742 | A | | 3/2015 | |
| JP | 2000003628 | A | | 1/2000 | |
| JP | 7124500 | B2 | * | 8/2022 | |
| WO | WO 2007014864 | A1 | | 2/2007 | |
| WO | WO 2008023365 | A1 | | 2/2008 | |
| WO | WO 2018222842 | A1 | | 12/2018 | |

OTHER PUBLICATIONS

CNIPA, Office Action issued Apr. 14, 2025 in corresponding Chinese Application No. CN 202080050916.1.

* cited by examiner

HYBRID CIRCUIT BREAKER WITH IMPROVED CURRENT CAPACITY PER DEVICE SIZE

CROSS REFERENCE TO RELATED APPLICATIONS

This application is a U.S. National Phase application under 35 U.S.C. § 371 of International Application No. PCT/EP2020/069370, filed on Jul. 9, 2020, and claims benefit to British Patent Application No. 1910176.5, filed on Jul. 16, 2019. The International Application was published in English on Jan. 21, 2021 as WO 2021/008993 A1 under PCT Article 21(2).

FIELD

The present invention relates to a hybrid circuit breaker.

BACKGROUND

A hybrid circuit breaker is generally described in U.S. Pat. No. 9,947,496 B2, for example. When the electro-mechanical bypass switch is opened due to e.g. an overload condition at the output connectors (e.g. because of an arc fault or a short circuit in the load or in a circuit leading to the load), a current over the switching contacts of the electro-mechanical bypass switch is passed over or commutated to the semiconductor circuit. In detail, an arc voltage is generated between the contacts of the electro-mechanical bypass switch when they are opened causing the current commutation from the bypass switch to the semiconductor switch. After the current commutation, the current through the hybrid circuit breaker does not longer flow over the electro-mechanical bypass switch, but flows over to the semiconductor circuit. By these measures, the deleterious effect of a switching arc across the switching contacts is reduced in time and thus has limited impact on the contacts. Accordingly, a hybrid circuit breaker combines the advantages of an electro-mechanical circuit breaker, which offers a very low on-state resistance but is prone to damages of the switching contacts due to massive arcing, and of a solid state circuit breaker, which has no mechanical switching contacts, but has a comparably high on-state resistance.

Furthermore, EP 2 750 257 B1 discloses a hybrid circuit breaker, in particular a high voltage direct current (HVDC) circuit breaker or switchgear that can be used in point-to-point and multi-terminal HVDC power collection, transmission and distribution networks.

Generally, a drawback of a hybrid circuit breaker is that it gets bulky when it has to conduct larger nominal currents because the semiconductor circuit then has to withstand very high over currents and fault currents. Accordingly, it also has to absorb very high electric energy, which results in substantial electrical stress on the components of the hybrid circuit breaker, in particular on the semiconductor circuit. Moreover, the electric energy is converted to thermal energy in the semiconductor circuit, which has to be absorbed and dissipated. In common concepts, the semiconductor circuit is made so massive that it can withstand that high over and fault currents so that, as said, the hybrid circuit breaker gets bulky when it comes to high currents.

Cooling of the semiconductor circuit in principle is possible, too, but it is technically complicated and challenging. The reason is that the thermal energy is generated very fast, in other words the thermal power is very high, and cooling has to take place close to the junction of the semiconductor parts to be effective. Usually, the outer surface of common housings is not suitable for cooling because of the thermal resistance between the junction and the outer surface and because of the thermal capacitance of the housing. In other words, cooling through the outer surface is too slow.

It should also be noted that the above problems increase more than linearly with the nominal current because in addition to the increased current the high speed electro-mechanical bypass switch slows down. The reason is that the conductive and movable parts are more massive to handle higher currents and are thus heavier. In turn, commutation of the current takes place later and takes longer due to the increased mass of the movable contacts of the electro-mechanical bypass switch. That is why the stress on the semiconductor circuit increases more than linearly with the nominal current.

In the above context it should be noted that the current does not immediately reach its top level when there is an arc fault or short circuit, but there is a steep current rise due to the grid's impedance. Because opening of the contacts to reach enough mechanical distance in order to establish the required dielectric strength takes some time, the semiconductor circuit conducts the worse part of the overload, i.e. the part with the higher currents. It is easy to understand that things become worse the longer it takes until current has commutated to the semiconductor circuit.

The very same problems also arise in view of other parts of the hybrid circuit breaker like in view of a varistor switched in parallel with the electro-mechanical bypass switch.

All in all, the advantage of a hybrid circuit breaker over electro-mechanical circuit breakers and solid state circuit breakers decreases with increasing nominal currents, and there is a technical and economic limit for the use of hybrid circuit breakers.

SUMMARY

An embodiment of the present invention provides a hybrid circuit breaker that includes: input connectors configured to receive electrical energy from a power grid; output connectors configured to transfer electrical energy to a load; current paths, each connecting a respective input connector, of the input connectors, and a respective output connector, of the output connectors; an electro-mechanical bypass switch in at least one of the current paths; a semiconductor circuit in parallel with the electro-mechanical bypass switch; a controller configured to control a commutation from the current path in which the electro-mechanical bypass switch is arranged to the semiconductor circuit in a switching operation; and an active cooling device in a vicinity of the electro-mechanical bypass switch. The active cooling device is adapted to cool movable parts of the electro-mechanical bypass switch.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
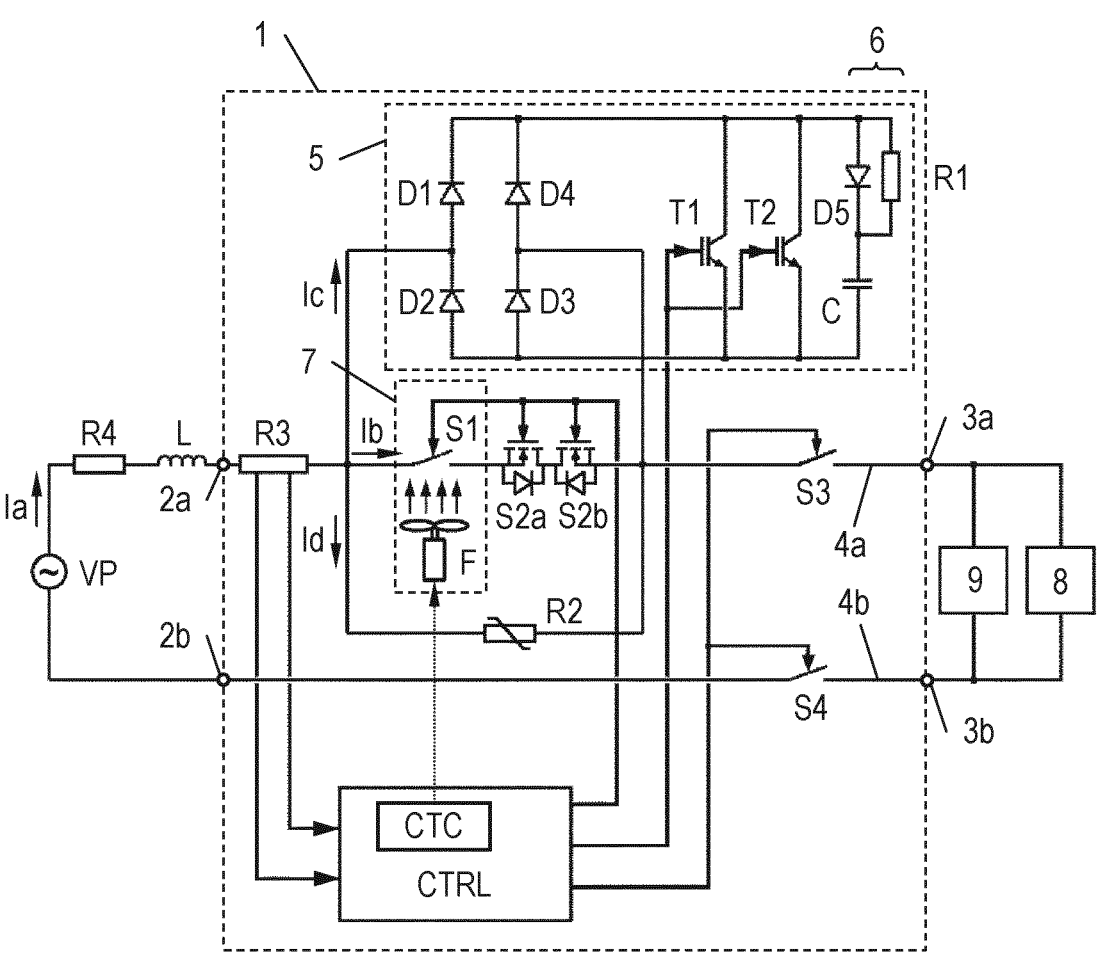
FIG. 1 shows a circuit diagram of an exemplary hybrid circuit breaker.

The present disclosure relates to a hybrid circuit breaker. A hybrid circuit breaker may include at least two input connectors for receiving electrical power from a power grid, at least two output connectors for transferring electrical power to a load, and current paths each connecting an input connector and an output connector. Furthermore, the hybrid circuit breaker may include a (high speed) electro-mechanical bypass switch in at least one of the current paths and a (power) semiconductor circuit in parallel with the electro-mechanical bypass switch. In particular, the semiconductor circuit may be embodied as a bi-directional power semiconductor circuit. A control unit of the hybrid circuit breaker can be capable of controlling a commutation from a current path, in which the electro-mechanical bypass switch is arranged, to the semiconductor circuit in case of a switching operation (e.g. at nominal current, at fault current or at over current) through the electro-mechanical bypass switch. In particular, current commutation may take place by generating an arc-voltage between the contacts of the electromechanical bypass switch. Furthermore, the present disclosure relates to a type series or group of hybrid circuit breakers of the above kind, wherein various hybrid circuit breakers of the type series or group of hybrid circuit breakers have a different nominal current capacity and/or different current-time characteristics. Finally, the present disclosure relates to a method to operate a hybrid circuit breaker of the above kind.

Embodiments of the present invention provide an improved hybrid circuit breaker. In particular, embodiments of the present invention enable the size of and the costs for the semiconductor circuit of the hybrid circuit breaker to be reduced, especially for high nominal currents. Particularly, embodiments of the present invention enable the technical and economic limit for the use of hybrid circuit breakers to be shifted to higher nominal currents without increasing the size and cost of the hybrid circuit breaker.

An improved hybrid circuit breaker according to embodiments of the present disclosure may include an active cooling device in the vicinity of the electro-mechanical bypass switch, which is adopted to cool movable parts of the electro-mechanical bypass switch.

Embodiments of the present invention provide a type series or group of hybrid circuit breakers, comprising various improved hybrid circuit breakers according to embodiments of the present invention, having a different nominal current capacity and/or different current-time characteristics (tripping characteristics).

Embodiments of the present invention provide a method to operate an improved hybrid circuit breaker according to an embodiment of the present invention, wherein movable parts of the electro-mechanical bypass switch are actively cooled by an active cooling device arranged in the vicinity of the electro-mechanical bypass switch.

Advantageously, a thermal coupling between the active cooling device and the electro-mechanical bypass switch, in particular its movable parts, is higher than a thermal coupling between the active cooling device and the semiconductor circuit. The cooling is concentrated to the electro-mechanical bypass switch, in particular its movable parts.

By the above measures, the hybrid circuit breaker can withstand higher over currents in general and can be used for higher nominal currents without increasing the size of the semiconductor circuit. Moreover, the technical and economic limit for the use of hybrid circuit breakers is shifted to higher nominal currents. So, a larger range of electrical installations may benefit from the advantages of a hybrid circuit breaker. In addition, a hybrid circuit breaker of a particular type or with a particular size can cover larger current-time characteristics (tripping curves). In that, a type series or group of hybrid circuit breakers, comprising various hybrid circuit breakers, which cover all desired current-time characteristics, can be made up with a lower number of hybrid circuit breakers of different type or of different size.

Surprisingly, cooling the electro-mechanical bypass switch is much more effective than cooling the semiconductor circuit. Cooling the electro-mechanical bypass switch also is technically less complex than cooling the semiconductor circuit. The temperature reduction at the semiconductor circuit achieved in this way with respect to traditional designs is very high and even higher than by use of a cooling device directly acting on the semiconductor circuit. In fact, the proposed measures particularly reduce electric stress on the semiconductor circuit.

The reason is that the electro-mechanical bypass switch has movable parts (e.g. pivotal levers or contact arms) which have to have larger cross sections for higher currents. This has an undesired and unexpected effect on the currents, which the semiconductor circuit has to withstand, and the electric energy which the semiconductor circuit has to convert into thermal energy in case of over current events or fault current events. Because the more massive the movable parts of the electro-mechanical bypass switch are, the slower they move under the same actuating force. This causes a substantial delay until the moving switching contacts of the electro-mechanical bypass switch lift off from its fixed switching contacts and thus causes also a substantial delay until the semiconductor circuit takes over the current from the electro-mechanical bypass switch and reaches enough mechanical distance to avoid re-ignition of the switching arc. The fast and steep current rise in case of an arc fault or a short circuit in combination with said delay leads to a tremendous increase of the currents, which the semiconductor circuit has to withstand, to an increase of electric energy which the semiconductor circuit has to convert into thermal energy in case of over current events or in case of fault current events and to an substantial increase of electric stresses in the semiconductor material. In other words, a delay of the mechanical movement of the switching contacts leads to a delayed current commutation, thus to higher current values at the semiconductor circuit and also to a longer duration until the required contact separation is reached to switch off the semiconductor circuit. In the end, the semiconductor circuit is loaded with higher currents for longer times. As stated hereinbefore, problems at the semiconductor circuit increase disproportionately (i.e. more than linearly) with the nominal current because of this delay phenomenon.

By cooling the electro-mechanical bypass switch, its movable parts can be made smaller and lighter and can move faster than without cooling. Accordingly, said contact opening time is shortened, and the size of and the costs for the semiconductor circuit are reduced. So, the surprising effects of this hybrid circuit breaker are based on that thermal energy is not drawn away from the semiconductor circuit to a large extent by cooling, but thermal energy and particularly electrical stress are actually avoided. In other words, advantage is taken of the leverage effect between cooling the electro-mechanical bypass switch and the multiplied effect on the semiconductor circuit. Just a low cooling power and thus just a small cooling device are needed for a large effect.

Cooling the semiconductor circuit without cooling the electro-mechanical bypass switch would need much higher cooling power and much larger cooling devices for the same effect. As stated above, moreover, cooling of the semiconductor circuit is technically complicated and challenging because it has to take place close to the junction of the semiconductor parts to be effective. So, the cooling of the electro-mechanical bypass switch according to the present disclosure is not only more effective, but also less complicated.

In other words, maintaining the temperature of the electro-mechanical bypass switch when increasing the nominal current of the hybrid circuit breaker also maintains the current interruption capability at basically the same level and thus also keeps the costs and the space for the hybrid circuit breaker at substantially the same level. In detail, by use of the above measures the electro-mechanical bypass switch can withstand higher currents without increasing the size, the mass and the inertia of the movable switching contacts of the electro-mechanical bypass switch. By keeping the mass and the inertia of the movable switching contacts at the same level, the opening speed of the bypass switch is kept same as well. Accordingly, the magnitude of the fault or over current size of the semiconductor circuit used in a hybrid circuit breaker is kept at the same level as well. Viewed from the opposite direction, this also means faster interruption, lower costs and less space at the same nominal current.

An additional effect of cooling the electro-mechanical bypass switch is reducing the loop inductance of the hybrid circuit breaker by reducing the size of the semiconductor circuit, in particular by reducing the active area of semiconductor parts. Reducing the loop inductance of the hybrid circuit breaker in turn means a reduction of the current commutation time from the electro-mechanical bypass switch to the semiconductor circuit. Reduced current commutation time also means less detrimental effect of the arc-voltage on the mechanical switching contacts of the electro-mechanical bypass switch. In other words, the proposed measures allow for higher currents without shortening the lifetime of the hybrid circuit breaker.

The very same advantages also are provided in view of other parts of the hybrid circuit breaker, for instance for a varistor switched in parallel with the electro-mechanical bypass switch.

So a small cooling device has multiple effects on the hybrid circuit breaker.

In the end, hybrid circuit breakers with this cooling feature can have the same size for higher nominal currents and can cover larger current-time characteristics (tripping curves) than in prior art or can be made smaller for the same nominal current than in prior art. Double nominal current normally means two times the size for the semiconductor circuit and hence two times the costs for the semiconductor circuit as well as four times the volume of a varistor switched in parallel with the electro-mechanical bypass switch and hence four times the costs for the varistor. By use of just a small cooling device this "law" can be undermined.

In an advantageous embodiment:

$$A < n \cdot \frac{0.25 \cdot I_{cu}}{di}$$

wherein A is an active chip area of the semiconductor circuit in $cm^2$, n is the number of power switching elements (e.g. diodes, transistors, thyristors, etc.) in the semiconductor circuit, $I_{cu}$ is a short circuit current switching capacity of the hybrid circuit breaker in Ampere and di is the current density of a single power switching element in $A/cm^2$. For a single power switching element and a typical current density $di=150$ $A/cm^2$, this particularly means:

$$A < 0.0017 [cm^2 A^{-1}] \cdot I_{cu}$$

and for a typical short circuit current switching capacity $I_{cu}=20$ kA:

$$A < 34.0 \ cm^2$$

In case that the semiconductor circuit comprises four non-controlled power switching elements (diodes) and one controlled power switching element (transistor, thyristor), n=5 and the total active chip area of the semiconductor circuit is below $5 \cdot 34.0 \ cm^2 = 170.0 \ cm^2$. In case there are four controlled power switching elements with freewheeling diodes, n=4 and the total active chip area of the semiconductor circuit is below $4 \cdot 34.0 \ cm^2 = 136.0 \ cm^2$. It should be noted in the above context that realization of a power switching element by a number of parallel power switching elements does not substantially increase the size of the semiconductor circuit. So, in the embodiment of the semiconductor circuit comprising four non-controlled power switching elements and one controlled power switching elements, the statement n=5 is still valid if the controlled power switching element, for example, is realized by two or more smaller transistors or thyristors, which are switched in parallel. The same equally applies to the non-controlled power switching elements.

The current density of the semiconductor circuit in the above formula relates to the active chip area of a single power switching element. However, the semiconductor chip has to be attached on an isolated substrate and interconnected via the bonding wires. Moreover, a housing is needed for the electronic circuit. Hence, the above factors 0.25 and 0.0017 have to be risen if a current density is used, which for example relates to a housing of the semiconductor circuit. Accordingly, the typical current density of $di=150$ $A/cm^2$ noted above refers to the active chip area of a single power switching element, and the current density referring to a housing of the semiconductor circuit is smaller in a corresponding way. It should also be noted that the current density $di=150$ $A/cm^2$ relates to a silicon chip, and the current density for a different technology may be deviate from the aforementioned value.

It should also be noted that the term $0.25 \cdot I_{cu}$ results from a current rise $dI/dt$ of 10 A/μs and a time span, during which the current flows over the semiconductor circuit (which time span is t4 in the FIGS.), of 500 μs (10 A/μs·500 μs=0.25·20 kA). Other values may lead to different results. Accordingly, the term $dI/dt \cdot t$4 may be used as numerator in the above formulas resulting in:

$$A < n \cdot \frac{dI/dt \cdot t4}{di}$$

Furthermore it is of advantage if:

$$V < \frac{2.54 \cdot 10^{-2} [HA] \cdot I_{cu}}{dE}$$

wherein V is a volume of a varistor switched in parallel with the electro-mechanical bypass switch in cm³, $I_{cu}$ is a short circuit current switching capacity of the hybrid circuit breaker in Ampere and dE is the energy density of the varistor in J/cm³, wherein the energy density dE refers to an effective volume of the varistor. For a typical energy density dE=250 J/cm³ this particularly means:

$$V < 1.02 \cdot 10^{-4} [cm^3 A^{-1}] \cdot I_{cu}$$

and for a typical short circuit current switching capacity $I_{cu}$=20 kA:

$$V < 2.04 \text{ cm}^3$$

The energy density of the varistor in the above formula relates to an effective varistor volume, i.e. the volume of the metal oxide material in case of a metal oxide varistor (MOV). Hence, the above factors $2.54 \cdot 10^{-2}$ and $1.02 \cdot 10^{-4}$ have to be risen if an energy density is used, which relates to a housing of the varistor. Accordingly, the typical energy density dE=250 J/cm³ noted above refers to the effective varistor volume, and the energy density referring to a housing of the varistor is smaller in a corresponding way.

It should also be noted that the term $2.54 \cdot 10^{-2}$ [HA]·$I_{cu}$ results from a current rise dI/dt of 10 A/µs and a time span, during which the current flows over the semiconductor circuit (which time span is t4 in the FIGS.), of 527 µs and an inductance of L=36.6 µH, which is chosen for $I_{cu}$=20 kA and a 50 Hz grid according to the standard IEC60947-1 (E=0.5·36.6 µH·(10 A/µs·527 µs)²=2.54·10⁻²·20 kA). Other values may lead to different results. Accordingly, the term $0.5 \cdot L \cdot (dI/dt \cdot t4)^2$ may be used as numerator in the above formulas resulting in:

$$V < \frac{0.5 \cdot L \cdot (dI/dt \cdot t4)^2}{dE}$$

Beneficially, a temperature of movable parts of the electro-mechanical bypass switch decreases about at least 10 C when the active cooling device is switched on at constant nominal current. In this way a substantial effect with regards reducing electrical and thermal stress of the semiconductor circuit can be achieved.

"Movable parts" are parts of the electro-mechanical bypass switch, which move in relation to the fixed contacts of the electro-mechanical bypass switch when changing the switching state of the electro-mechanical bypass switch between an "ON" state and an "OFF" state. In particular, the movable parts include the movable switching contacts and levers or discs, which the movable switching contacts are mounted to or which are the movable switching contacts part of.

"Adopted to cool movable parts" in the context of the invention means, that the active cooling device in its on-state draws away heat from the movable parts of the electro-mechanical bypass switch, particularly by heat transmission, heat convection and/or heat radiation. For example, a cooling surface of an active cooling device may be attached to the movable parts of the electro-mechanical bypass switch to cool the same basically by heat transmission. A cooling surface of an active cooling device may also be arranged in the vicinity of the movable parts of the electro-mechanical bypass switch to cool the same basically by heat radiation. Moreover, an active cooling device may generate a flow of a cooling fluid which is guided over the movable parts of the electro-mechanical bypass switch to cool the same basically by heat convection.

"Thermal coupling" can be defined by the cooling effect on the thermally coupled device, for example by how many degrees Kelvin the thermally coupled device cools down when the cooling device is active compared to the inactive cooling device. "Thermal coupling" can also be defined via the dissipated thermal energy.

In particular, a temperature difference at the switching contact with inactive/active cooling is preferably greater than a temperature difference in a junction layer of a semiconductor component of the semiconductor circuit with inactive/active cooling. Alternatively or in addition, the dissipation of energy/power at the switching contacts caused by the cooling device is preferably greater than the dissipation of energy/power in the junction layer of a semiconductor component of the semiconductor circuit.

"Current-time characteristics" or "tripping characteristics" denotes the capability of the hybrid circuit breaker to conduct an over current of a defined level for a defined span of time. For example, the time until the circuit breaker is tripped versus the current through the circuit breaker may be defined as a multiple of the nominal current in current-time characteristics diagrams. For example there are type "B" circuit breakers (standard), type "C" circuit breakers (raised switch-on or inrush current) and type "D" circuit breakers (high capacitive or inductive load). A type "D" circuit breaker is more robust in terms of over current over time than a type "C" circuit breaker, and a type "C" circuit breaker is more robust than a type "B" circuit breaker. Accordingly, a type "D" circuit breaker is more suitable for heavy loads than a type "C" circuit breaker, and a type "C" circuit breaker is more suitable for heavy loads than a type "B" circuit breaker. In other words a type "D" circuit breaker allows for more over current than a type "C" circuit breaker, and a type "C" circuit breaker allows for more than a type "B" circuit breaker.

The electro-mechanical bypass switch, in particular, is embodied as a "high speed" electro-mechanical bypass, which means that the switching time from powering the actuator for the movable switching contacts (e.g. from feeding current into a relay coil) until the total gap between the fixed switching contacts and the movable switching contacts is above 1.2 mm for embodiments without an electronic bypass switch and above 0.15 mm for embodiments with an electronic bypass switch is ≤1 ms (whereas typical relays offer an opening time of 20-30 ms). The reason for the different gap values is that the air between the switching contacts stays "cold" in case of an electronic bypass switch is used, which avoids a switching arc, whereas it gets "hot" and ionized in case of no electronic bypass switch is used and a switching arc occurs. In particular embodiments, said switching time can be ≤400 µs (e.g. in a range of 300-500 µs). In particular, a time span between a time point, at which an electrical fault occurs, and a time point, at which a current flowing over the semiconductor circuit drops to zero, is <450 µs). Particularly, if a "high speed" electro-mechanical bypass switch is used for the hybrid circuit breaker, a cooling for the semiconductor circuit may be omitted. The reason is that there is no considerable temperature rise in the semiconductor circuit in that short time even for high cut off currents. In other words, a thermal coupling between the active cooling device and the semiconductor circuit may be <0.05 times the thermal coupling between the active cooling device and the electro-mechanical bypass switch. It should be noted that the above referenced contact gap refers to the total gap, which is the same for a single contact pair and twice the (single) contact gap of a double contact pair.

As defined above, the "switching time" is the time from powering the actuator for the movable switching contacts until the total gap between the fixed switching contacts and the movable switching contacts is reached. The "full opening time" is the time which is needed from lift off of the movable switching contacts from the fixed switching contacts until said total gap is reached. The "contact delay" is the time, which is needed from powering the actuator for the movable switching contacts until the movable switching contacts start to move. In other words this means:

switching time=contact delay+full opening time

Generally, the power of the cooling device is very low and in the range of some Watts. Usually, the cooling power for the hybrid circuit breaker is much lower than the power loss of a solid state circuit breaker for the same nominal current. So, it is very economic to add this low power cooling device to hybrid circuit breaker and to use the combination instead of a solid state circuit breaker. For example, a cooling device may have 2 W. In laboratory tests it was found out that by use of a small fan, the nominal current of the electro-mechanical bypass switch can be doubled. In other words, at the same nominal current, mass of the moving parts of the electro-mechanical bypass switch can be halved and thus speed of said parts can be doubled.

The nominal voltage of the hybrid circuit breaker particularly is <1500 VDC or <1000 VAC RMS. When the hybrid circuit breaker is used for alternating current, it has to be prepared for bi-directional current flow, what in particular means that the semiconductor circuit has to be embodied as a bi-directional power semiconductor circuit. For instance, the semiconductor circuit may have a rectifier for this reason.

As disclosed above, the switching time of the hybrid circuit breaker can be in the range of some 100 µs. It should also be noted in this context that the basic intention is not about cooling a switching arc (if there is any at all), but about cooling the current conducting metal parts of the electro-mechanical bypass switch. Cooling a switching arc may happen, but this is just a side effect.

In this context it should also be noted, that the power of the active cooling device (e.g. 2 W) is very low in comparison to the power of a possible switching arc. If the hybrid circuit breaker for example has a nominal current of 50 A and the lowest tripping current for example is 75 A, then the power of the switching arc Parc is approximately:

$$Parc=12 \text{ V(arc voltage)}\times75 \text{ A(tripping current)}\times 0.5=450 \text{ W}$$

However, the tripping current may also be ten times the nominal current what leads to a switching arc power of 3000 W in the above example. Note that the factor 0.5 results from a linear current ramp. In a beneficial embodiment, the power of the active cooling device is smaller than 2% of the switching arc power at the lowest tripping current of the hybrid circuit breaker (which in particular is 1.5 times the nominal current of the hybrid circuit breaker). In other words:

$$Pc<0.02\times Parc[@Itrip] \text{ or } Pc<0.03\times Parc[@Inom]$$

wherein Pc is the cooling power, Parc[@Itrip] is the power of the switching arc at the lowest tripping current and Parc[@Inom] is the power of the switching arc related to the nominal current of the hybrid circuit breaker.

In particular, an (unintended) temperature reduction of the switching arc with that low cooling power is <5 C. In other words, the temperature of the switching arc in the on-state of the active cooling device is just lower by less than 5 C than the temperature of the switching arc in the off-state of the active cooling device.

It should also be noted that some embodiments of the electro-mechanical bypass switch are capsuled, which means that a movable contact piece, a fixed switching contact and a movable switching contact are built into an airtight space, which may be evacuated or may be filled with an inert gas as the case may be. In such a case, cooling of the switching arc is not possible at all.

Beneficially, the cooling device is capable of generating a heat flow when the electro-mechanical bypass switch is closed and/or a heat flow >90% of the operating time of the hybrid circuit breaker In this way, the electro-mechanical bypass switch is cooled during normal operation of the hybrid circuit breaker and is held in good condition for a possible occurrence of a short circuit or arc fault. The cooling control may be a separate device or integrated into the commutation control of the hybrid circuit breaker. The fan may also be connected to a power source directly without to be controlled by a cooling control.

Furthermore, the electro-mechanical bypass switch may be cooled during normal operation of the hybrid circuit breaker and can be held in good condition for a possible occurrence of a short circuit or arc fault.

The "operating time" in the context of the invention is the time, during which a current flows (or can flow) over the electro-mechanical bypass switch.

Furthermore, the electro-mechanical bypass switch may be cooled in an over current situation and is held in good condition for a possible tripping event. The cooling control may be a separate device or integrated into the commutation control of the hybrid circuit breaker. The cooling device may also be connected to a power source directly without to be controlled by a cooling control. The current range during the on-state of the cooling device may include or exclude the tripping current.

Beneficially, the cooling device is arranged in a housing of the hybrid circuit breaker, which also houses the electro-mechanical bypass switch and the semiconductor circuit. In this way, all necessary functions are integrated within a common single housing.

In embodiments having a fan placed in direct vicinity of fixed and movable switching contact, air simply can be used as a cooling fluid, which can be guided over the movable parts (including the movable switching contact(s)) of the electro-mechanical bypass switch. Advantageously, an air stream caused by the fan can also be guided over the fixed switching contact(s) of the electro-mechanical bypass switch. It can be an advantage if a cooling control is operatively connected to the fan and is prepared to increase an air stream of the fan before the electro-mechanical bypass switch is closed. In this way, burn-off material-loss can be blown away from the fixed and movable switching contacts thus increasing the life span of the electro-mechanical bypass switch. It should also be noted that the fan needs not to be stopped during a switching arc event, but it may also (but not only) run when a switching arc occurs. Although, guiding an air stream over the movable parts of the electro-mechanical bypass switch, a fan may also be used to cool a capsuled electro-mechanical bypass switch, where a movable contact piece, a fixed switching contact and a movable switching contact are built into an airtight space. The term "direct vicinity" in the above context particular means a distance between the fan and a fixed switching contact or a distance between the fan and a movable switching contact of less than 20 mm.

In an alternative advantageous embodiment of the hybrid circuit breaker, the active cooling device is embodied as a Peltier-element. In this way, cooling can be done without moving parts.

In yet another advantageous embodiment of the hybrid circuit breaker, the cooling device is embodied as immersion cooling or a heat exchanger with a liquid heat carrier, wherein a barrier separates the moving parts of electro-mechanical bypass switch from the liquid heat carrier. Advantage is taken of the comparably high heat capacity of a liquid heat carrier what means that high levels of cooling power can be achieved. A barrier separates the moving parts of electro-mechanical bypass switch from the liquid heat carrier, so that the moving parts may freely move (in air or in a gas) and are not damped by the liquid.

In another advantageous embodiment, the hybrid circuit breaker comprises an electronic bypass switch (which may be also denoted as "auxiliary semiconductor switch") switched in series with the electro-mechanical bypass switch, wherein the series connection of the electronic bypass switch and the electro-mechanical bypass switch is switched in parallel with semiconductor circuit. The electronic bypass switch cuts off the current before the electro-mechanical bypass switch opens so that a switching arc over the switching contacts of the electro-mechanical bypass switch is avoided. Accordingly, life time of the electro-mechanical bypass switch is increased. In addition, a safe air gap between the switching contacts of the electro-mechanical bypass switch is reached faster because of the absent switching arc there is no arc-plasma between the contacts of the electro-mechanical switch reducing isolation capability of the air gap. In other words, the electronic bypass switch reduces the full opening time of the electro-mechanical bypass switch because the movable switching contacts do not need to move so far. But still, the semiconductor circuit should not cut off the current unless the air gap between the switching contacts of the electro-mechanical bypass switch is large enough to withstand the peak voltage caused by the semiconductor circuit without risking a flashover between the switching contacts of the electro-mechanical bypass switch so as to avoid avalanche breakdown of the electronic bypass switch. So, by use of the electronic bypass switch, both the load of the electro-mechanical bypass switch and the semiconductor circuit can be reduced because the current through the hybrid circuit breaker is commutated to the semiconductor circuit faster and hence at lower current levels than in case of a hybrid circuit breaker without an electronic bypass switch.

It should be noted, that cooling the movable parts of the electro-mechanical bypass switch is useful without any restriction in case an electronic bypass switch is used, which avoids a switching arc over the contacts of the electro-mechanical bypass switch, since the benefits of said cooling are not linked to the existence of a switching arc.

It should also be noted at this point that the electronic bypass switch generally has a very low ON-state resistance, but a low breakdown voltage whereas the breakdown voltage of the semiconductor circuit has a comparably high ON-state resistance and a high breakdown voltage. For instance, the breakdown voltage of the electronic bypass switch is 10-50 times smaller than the breakdown voltage of the semiconductor circuit. In detail, the breakdown voltage of the electronic bypass switch may be in the range of 30 V whereas the breakdown voltage of the main semiconductor switch may be in the range of 1200 V.

When the hybrid circuit breaker is used for alternating current, the electronic bypass switch has to be prepared for that. For instance, it may be embodied by two anti-series transistors (in particular by two anti-series MOSFETs).

In another advantageous embodiment, the electro-mechanical bypass switch is a multi-contact pair switch. For example, it may comprise two or more contact pairs, i.e. two pairs of fixed and movable switching contacts. By use of the multiple contact pairs multiple arcs with multiple arc voltages are generated what reduces the switch off and commutation time because the desired safe contact gap is split into a number of contact gaps, which simultaneously or almost simultaneously enlarge at opening of the switching contacts, however at the cost of increased complexity, reduced reliability and a slightly increased weight.

Beneficially, various hybrid circuit breakers of a type series or group of hybrid circuit breakers having different nominal current capacities and/or different current-time characteristics comprise electro-mechanical bypass switches of the same type and/or semiconductor circuits of the same type. In a further advantageous embodiment, housings for various hybrid circuit breakers of a type series of hybrid circuit breakers having a different nominal current and/or having different current-time characteristics have the same outer dimensions. By the above measures, the number of different types of complex parts of the hybrid circuit breaker, in detail the number of different types of electro-mechanical bypass switches for a type series of hybrid circuit breakers and/or the number of different types of semiconductor circuits for a type series of hybrid circuit breakers is reduced. In turn, a type series/group of hybrid circuit breakers having different nominal current capacities and/or having different current-time characteristics can be produced with less technical effort and cheaper.

Beneficially, various hybrid circuit breakers of a type series or group of hybrid circuit breakers comprise cooling devices of different types. In this way, different cooling power to realize different nominal current capacities with the same type of electro-mechanical bypass switch and/or semiconductor circuit may be easily achieved over a large range of different nominal current capacities and/or over a large range of different current-time characteristics.

However, it is also advantageous if various hybrid circuit breakers of a type series or group of hybrid circuit breakers comprise cooling devices of the same type. In this case, one and the same cooling device may be operated at different power levels so as to provide cooling power which fits to a particular nominal current capacity and/or to a particular current-time characteristics. Alternatively, the cooling device can be operated at a power level, which fits to the highest nominal current capacity within a group of hybrid circuit breakers using the same type of cooling device and/or to the heavies current-time characteristics within said group. Accordingly, the cooling power for lower nominal current capacities exceeds the actual demands then.

In an advantageous embodiment of the type series or group of hybrid circuit breakers a first hybrid circuit breaker of the type series of hybrid circuit breakers comprises a cooling device and has a first nominal current capacity and/or a first current-time characteristics and a second hybrid circuit breaker of the type series of hybrid circuit breakers without cooling device has a second nominal current capacity below said first nominal current capacity and/or a second current-time characteristics, which is less robust than the first current-time characteristics.

This is a special case of different cooling powers within a type series of hybrid circuit breakers, wherein the cooling power for one hybrid circuit breaker is zero, meaning that there is no demand for a cooling device at all. In case of different nominal current capacities, this for example means that the first nominal current capacity can be 200 A, whereas the second nominal current capacity can be 100 A. In case of different current-time characteristics, the above for example means that the first current-time characteristics can be a "D" tripping characteristic, whereas the second current-time characteristics can be "C" tripping characteristic.

According to an embodiment, the cooling power may be adapted to changing demands. In detail, cooling power is increased when the current over the electro-mechanical bypass switch increases to keep the latter in good condition for a switch-off event. Alternatively or in addition, the cooling power may be varied in accordance with a current-time characteristics. It is imaginable, that one and the same hybrid circuit breaker provides a variety of current-time characteristics or tripping characteristics, which may be chosen in a setup procedure. For instance, one of an "B"-type, "C"-type or "D"-type characteristics may be chosen. Accordingly, cooling power may be increased when there is a changeover from "B"-type to "C"-type or from "C"-type to "D"-type and vice versa. Generally, cooling power may be varied continuously or in steps. Preferably, cooling power changes continuously in accordance with a current over the electro-mechanical bypass switch and/or changes in steps in accordance with different current-time characteristics. It should be noted that providing a variety of current-time characteristics in a single hybrid circuit breaker is no necessary condition, but different current-time characteristics may also be provided by different hybrid circuit breakers with electro-mechanical bypass switches of the same type and/or semiconductor circuits of the same type and with cooling devices of different types or with cooling devices of the same type running at different power levels.

Aspects of the present invention now are described in more detail hereinafter with reference to particular embodiments, which the invention however is not limited to.

Generally, same parts or similar parts are denoted with the same/similar names and reference signs. The features disclosed in the description apply to parts with the same/similar names respectively reference signs. Indicating the orientation and relative position (up, down, sideward, etc.) is related to the associated figure, and indication of the orientation and/or relative position has to be amended in different figures accordingly as the case may be.

FIG. 1 shows an exemplary hybrid circuit breaker 1, which comprises two input connectors 2a, 2b for a power grid, two output connectors 3a, 3b for a load and current paths 4a, 4b each connecting an input connector 2a, 2b and an output connector 3a, 3b. Furthermore, the hybrid circuit breaker 1 comprises an electro-mechanical bypass switch S1 in the current path 4a and a semiconductor circuit 5 in parallel with the electro-mechanical bypass switch S1. In the example of FIG. 1, the hybrid circuit breaker 1 comprises two optional anti-series electronic bypass switches S2a, S2b (here in detail MOSFETs) switched in series to the electro-mechanical bypass switch S1.

The semiconductor circuit 5 comprises a rectifier D1.D4, the inputs of which are connected to the endpoints of the series connection of the electro-mechanical bypass switch S1 and the electronic bypass switches S2a, S2b. In this example, two parallel transistors T1, T2 (here in detail IGBTs) are switched between the outputs of the rectifier D1.D4. However, a different number of transistors T1, T2 may be used instead. Furthermore, an optional snubber circuit 6 is arranged in parallel with the two transistors T1, T2. The snubber circuit 6 comprises a series connection of a snubber resistor R1 and a snubber capacitor C and a snubber diode D5 in parallel with the snubber resistor R1.

The hybrid circuit breaker 1 furthermore comprises a varistor R2, which is connected to the endpoints of the series connection of the electro-mechanical bypass switch S1 and the electronic bypass switches S2a, S2b and forms an overvoltage protection for the same.

In addition, the hybrid circuit breaker 1 comprises a shunt R3, the terminals of which are connected to inputs of a control unit (controller) CTRL and which serves for measuring a current Ia flowing over the input connector 2a.

The control unit CTRL is not only for measuring the current Ia, but is also being capable of controlling a commutation from the current path 4a, in which the electro-mechanical bypass switch S1 is arranged, to the semiconductor circuit 5 in case of a switching operation (e.g. in case of an over current through the electro-mechanical bypass switch S1). In particular, commutation can be initiated when the electro-mechanical bypass switch S1 is opened by the control unit CTRL and an arc voltage is generated. For this reason the outputs of the control unit CTRL are connected to the input terminals of the electro-mechanical bypass switch S1, to the electronic bypass switches S2a, S2b and to the transistors T1, T2.

Moreover, the hybrid circuit breaker 1 comprises switches S3, S4 in the current paths 4a, 4b providing a galvanic separation. Outputs of the control unit CTRL may be connected to the input terminals of the switches S3, S4, too.

Finally, the hybrid circuit breaker 1 comprises an active cooling device F, wherein a thermal coupling between the cooling device F and the electro-mechanical bypass switch S1 is higher than a thermal coupling between the cooling device F and the semiconductor circuit 5. In simple words, the cooling power is focused or concentrated on the electro-mechanical bypass switch S1.

In detail, the active cooling device F is embodied as a fan here. The fan F and the electro-mechanical bypass switch S1 may form a combined bypass device 7. The fan F may be controlled by a cooling control CTC or may simply be connected to a power source. The cooling control CTC may be a separate device or may be integrated into the (commutation) control unit CTRL as this is the case in the example of FIG. 1.

Figure 4:
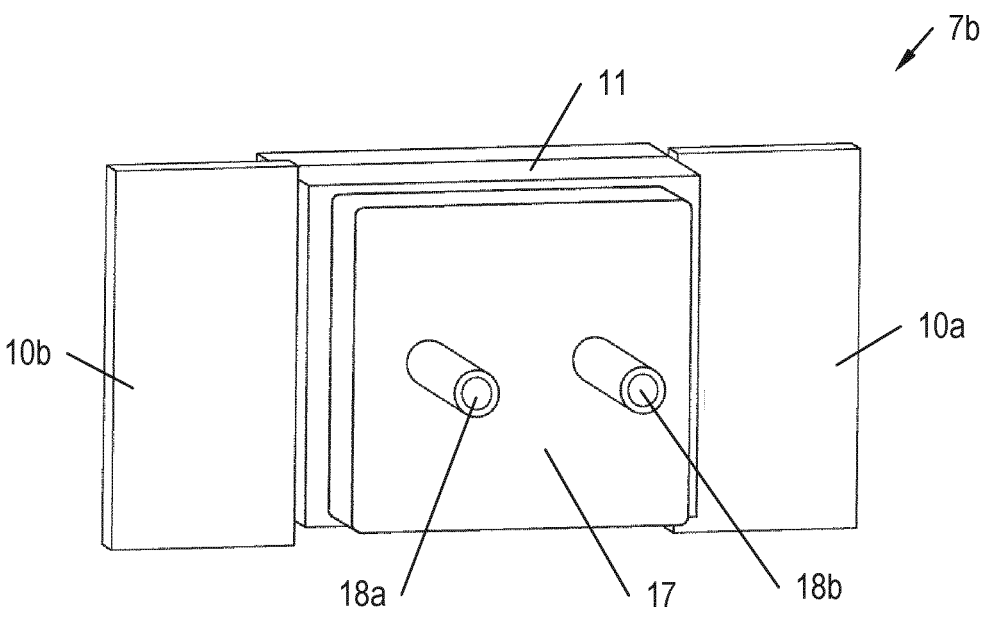
FIG. 4 shows an oblique view of a bypass device with a heat exchanger or Peltier element.

Generally, other cooling devices than a fan F may be used to cool the electro-mechanical bypass switch S1 as well, for example a heat exchanger or a Peltier-element (see FIG. 4).

FIG. 1 also shows a voltage source VP in series with a series grid resistance R4 and a series grid inductance L connected to the input connectors 2a, 2b of the hybrid circuit breaker 1. At the output connectors 2a, 2b there is connected a load 8 and also shown, an electrical fault 9, for example in the form of a short circuit or an arc flash.

The fan F preferably is arranged in a housing of the electro-mechanical bypass switch S1 and/or arranged in a housing of the hybrid circuit breaker 1, which also houses the electro-mechanical bypass switch S1 and the semiconductor circuit 5.

Figure 2:
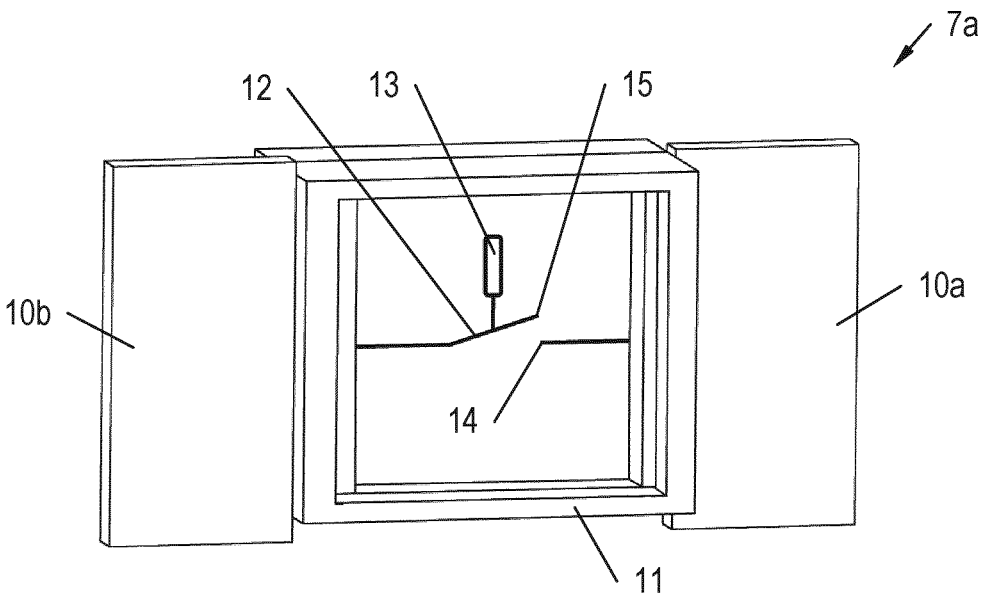
FIG. 2 shows an oblique view of a capsuled bypass device with detached cooling device.
Figure 3:
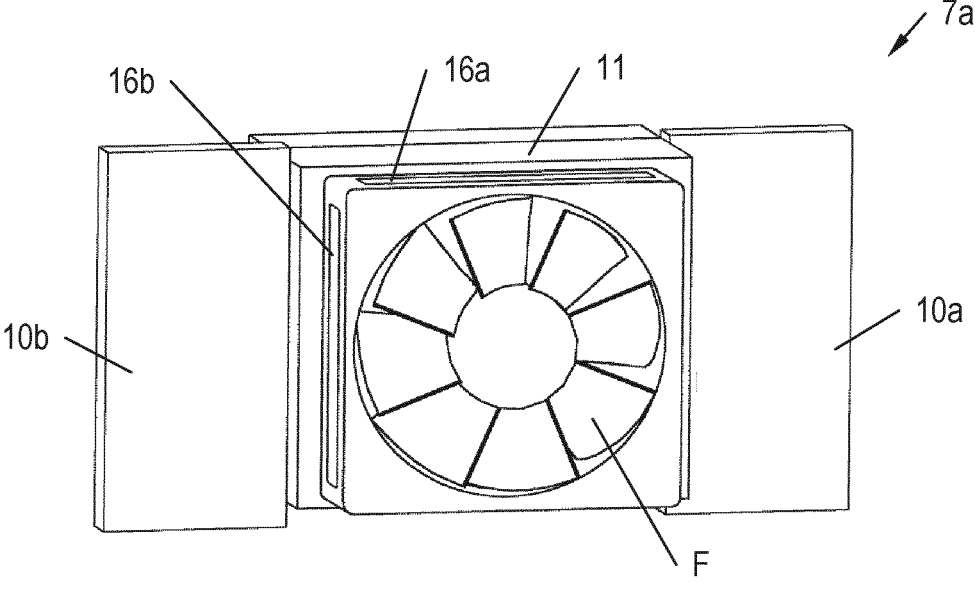
FIG. 3 shows an oblique view of a bypass device with a fan.

FIGS. 2 and 3 now show a first embodiment of the bypass device 7a in more detail, FIG. 2 without the fan F and FIG. 3 with the fan F. The bypass device 7a comprises two terminals 10a, 10b, which are attached to a base body 11. Furthermore, the bypass device 7a comprises a movable contact piece 12 and an actuator 13 connected thereto. In this embodiment, the movement of the movable contact piece 12 is a rotation. However, the movement of the movable contact piece 12 may be a translation or a combined movement as well. The actuator 13 preferably is an electromechanical actuator (e.g. a coil).

A fixed switching contact 14 is conductively connected with the terminal 10a, and a movable switching contact 15 is arranged on the movable contact piece 12 and conductively connected with the terminal 10b in this example. The terminals 10a, 10b, the movable contact piece 12, the fixed switching contact 14 and the movable switching contact 15 are made of metal (preferably from gold, copper or a copper alloy).

In the position of the contact piece 12 shown in FIG. 2, the fixed switching contact 14 and the movable switching contact 15 are opened. Accordingly, the two terminals 10a, 10b and conductors mounted to the terminals 10a, 10b are electrically disconnected. If the contact piece 12 is moved in its lower position by means of the actuator 13, the fixed switching contact 14 and the movable switching contact 15 are closed and the terminals 10a, 10b and conductors mounted to the terminals 10a, 10b are electrically connected.

FIG. 3 shows that the fan F for cooling the movable parts (here the contact piece 12 with the movable switching contact 15) of the electro-mechanical bypass switch S1 is arranged in the (direct) vicinity of the electro-mechanical bypass switch S1.

In the embodiment shown in FIGS. 2 and 3 the space, which the movable contact piece 12, the fixed switching contact 14 and the movable switching contact 15 are built in, is a capsuled space. This space may be sealed by a bottom plate of the fan F or by means of a separate closing plate. Furthermore, said space may be evacuated or may be filled with an inert gas as the case may be. Cooling air sucked in by the fan F is blown out through the outlets 16a, 16b in this example.

FIG. 4 shows an alternative embodiment of a bypass device 7b, which is quite similar to the bypass device 7a shown in FIGS. 2 and 3. In fact, the arrangement shown in FIG. 2 applies to the bypass device 7b of FIG. 4. Just the fan F is exchanged by a heat exchanger 17 with two connectors 18a, 18b. The connector 18a may be an input for a gaseous or liquid heat carrier, and the connector 18b may be an output for said heat carrier. As generally known, the heat carrier is cooled down in a further heat exchanger thus cooling the movable contact piece 12. Again, the space, which the movable contact piece 12, the fixed switching contact 14 and the movable switching contact 15 are built in, is a capsuled space, which may be evacuated or may be filled with an inert gas as the case may be.

The above type of cooling can be seen as a kind of an immersion cooling. Generally, cooling power can be increased if a liquid heat carrier is used since liquids usually have higher thermal capacities than gases. Examples for cooling liquids are water, oil or electrically insulating liquids.

Instead of a fan F or a heat exchanger 17, a Peltier-element may be used to cool the movable contact piece 12. The arrangement then is basically the same as shown in FIG. 4, and the device denoted with the reference sign "17" is the Peltier-element. The connectors 18a, 18b become electrical connectors. Also, in this case, the space, which the movable contact piece 12, the fixed switching contact 14 and the movable switching contact 15 are built in, is a capsuled space, which may be evacuated or may be filled with an inert gas.

Figure 5:
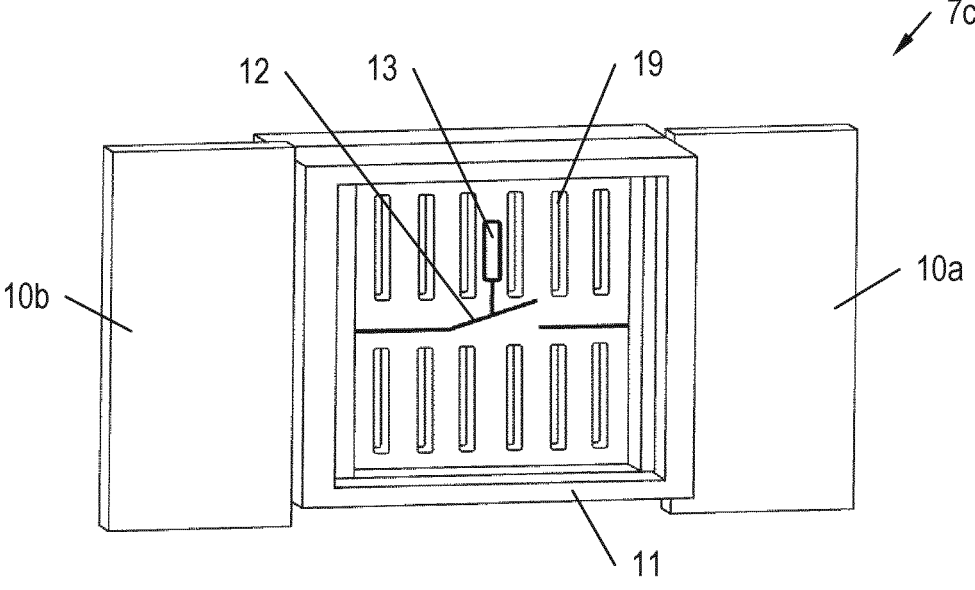
FIG. 5 shows an oblique view of a non-capsuled bypass device with detached fan.

In the above examples, the bypass devices 7a, 7b are equipped with capsuled spaces for the movable contact piece 12, the fixed switching contact 14 and the movable switching contact 15. This is beneficial, but no mandatory condition. In an alternative embodiment of a bypass device 7c, which is shown in FIG. 5, air is blown through this space and thus over the movable contact piece 12. For this reason, the back plate of the base body 11 comprises recesses 19, through which air compressed by the fan F is blown out. Outlets 16a, 16b may be omitted in this case.

Preferably, an air stream caused by the fan F is not only guided over the movable parts of the electro-mechanical bypass switch S1 (here the contact piece 12 with the movable switching contact 15), but also guided over the fixed switching contact 14. In this way, burn-off material-loss can be blown away from the fixed switching contact 14 and the movable switching contact 15 thus increasing the life span of the electro-mechanical bypass switch S1. To improve this effect, it is also of particular advantage if the cooling control CTC increases an air stream of the fan F before the fixed switching contact 14 and the movable switching contact 15 of electro-mechanical bypass switch S1 are closed.

It should be noted that an air stream caused by the fan F may be concentrated on the contact piece 12 by means of a nozzle.

It should also be noted that a piggyback fan F is no necessary condition and the fan F may also installed remote of the electro-mechanical bypass switch S1. In one embodiment, one single fan F is provided for a plurality of electro-mechanical bypass switches S1. Such a fan F may even be arranged external of the hybrid circuit breaker 1. The hybrid circuit breaker 1 may then comprise a cooling connector for compressed air, for example a cooling connector for a pipe leading to a fan F.

Furthermore, one should note that the bypass devices 7a . . . 7c are not limited to a single cooling device F, 17, but a plurality of cooling device F, 17 may be part of a bypass device 7a . . . 7c. For example a first cooling device (e.g. a first fan F, a first heat exchanger 17 or a first Peltier-element) may be arranged on the front side of the bypass devices 7a . . . 7c like this is shown in FIGS. 3 and 4, and a second cooling device (e.g. a second fan F, a second heat exchanger 17 or a second Peltier-element) may be arranged on the back side of the bypass devices 7a . . . 7c (not explicitly shown in FIGS. 3 and 4). The types of the cooling devices F, 17 may even be mixed. For example, a fan F may be arranged on the front side of the bypass device 7a . . . 7c, whereas a heat exchanger 17 is arranged on its back side, and so on.

It should be noted that the bypass devices 7a . . . 7c shown in FIGS. 2 to 5 comprise just a single contact pair with the fixed switching contact 14 and the movable switching contact 15. Nonetheless, the bypass devices 7a . . . 7c may also comprise a plurality of contact pairs with a plurality of fixed switching contacts 14 and a plurality of movable switching contacts 15. If the contact pairs are switched in series, a large total contact gap between the contact pairs can be achieved with a plurality of single contact gaps. Accordingly, a safe contact cap can be reached faster with the same movement of a movable switching contact 15. If the contact pairs are switched in parallel, the bypass device 7a ... 7c can conduct higher currents. So, generally a single contact pair may be exchanged with a plurality of contact pairs throughout the description.

The function of the arrangement shown in FIG. 1 is now explained by reference to FIG. 6. First an embodiment without electronic bypass switches S2a, S2b is described, then an embodiment with electronic bypass switches S2a, S2b.

Figure 6:
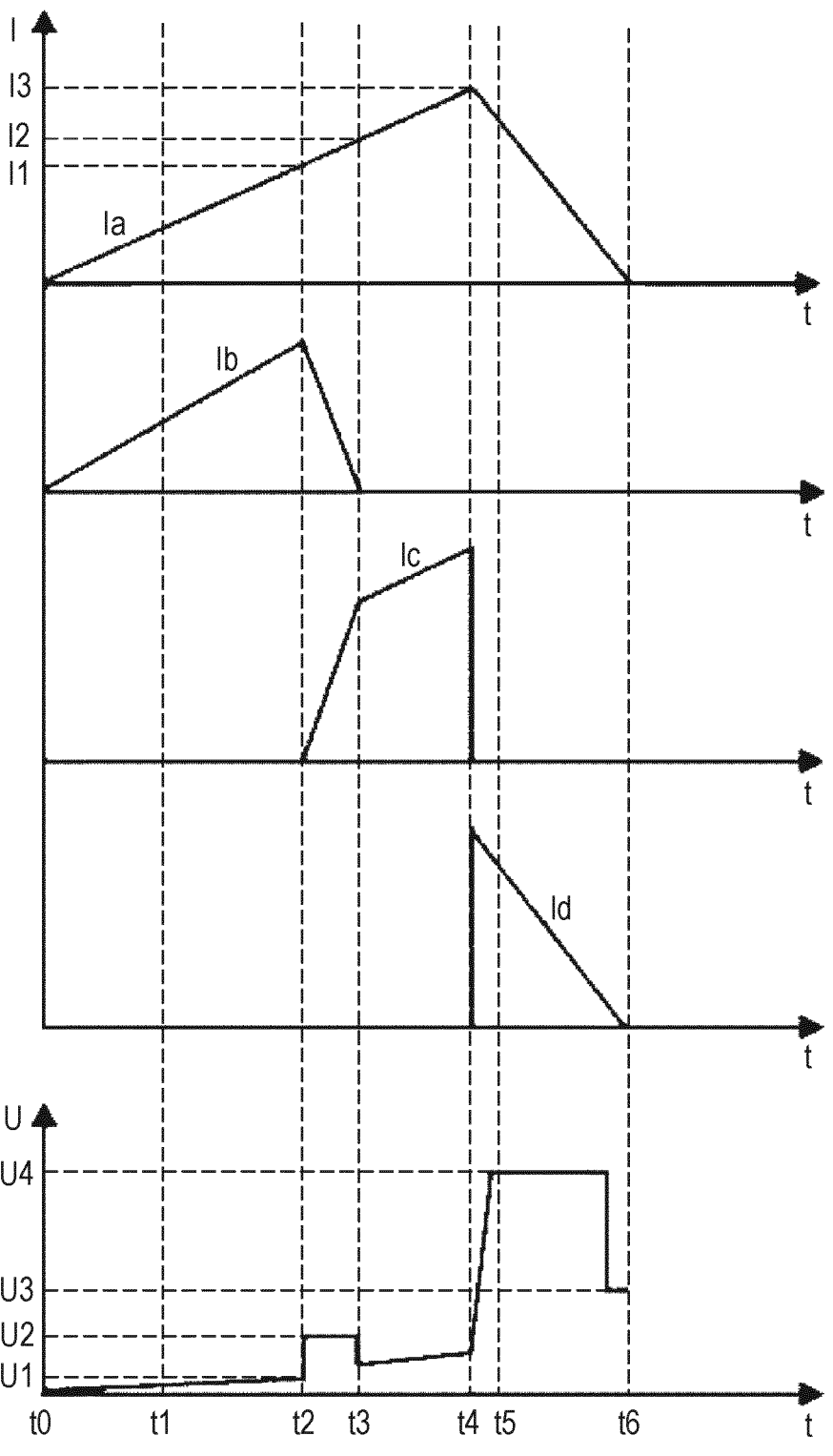
FIG. 6 shows graphs of various electrical parameters of the hybrid circuit breaker of FIG. 1 in case of fault.

Hybrid Circuit Breaker without Electronic Bypass Switches:

The first diagram of FIG. 6 shows the current Ia flowing over the input connectors 2a, 2b. The second diagram shows the current Ib flowing over the electro-mechanical bypass switch S1, the third diagram shows the third current Ic flowing over the semiconductor circuit 5 and the fourth diagram shows the current Id flowing over the varistor R2. The fifth diagram in FIG. 6 shows the (total) voltage U across the fixed switching contact 14 and the movable switching contact 15 of the electro-mechanical bypass switch S1 at dedicated time points t0 . . . t6.

During normal operation, the electro-mechanical bypass switch S1, the switches S3, S4 and the transistors T1, T2 are in their ON-state thus connecting the input connector 2a and the output connectors 3a and allowing a current flow over the current paths 4a, 4b (note that in this example there are no electronic bypass switches S2a, S2b). The electro-mechanical bypass switch S1 bypasses the transistors T1, T2 and the rectifier D1 . . . D4 after this is turned on. It takes over the current from the transistors T1, T2 to decrease forward voltages on the diodes D1 . . . D4 and the transistors T1, T2 and thus to decrease the power loss of the hybrid circuit breaker 1 at normal operation.

To further decrease the power loss of the hybrid circuit breaker 1 at normal operation, the transistors T1, T2 may also be switched off once the electro-mechanical bypass switch S1 has become conductive.

It is assumed that at time point t0 an electrical fault 9 occurs, for example a short circuit or an arc flash. As a consequence, the first current Ia rises as this is depicted in the first diagram of FIG. 6. First, the whole current Ia is flowing over the electro-mechanical bypass switch S1 because of its low ON-state resistance, meaning Ib=Ia. Accordingly, the voltage U at the fixed switching contact 14 and the movable switching contact 15 of the electro-mechanical bypass switch S1 rises slowly because just the resistance of the (copper) conductors is relevant at this time.

At time point t1, the control unit CTRL detects the over current situation by monitoring the voltage across the shunt R3. In turn, the control unit CTRL sends an OPEN command to the electro-mechanical bypass switch S1. In addition, the control unit CTRL sends a CLOSE command to the transistors T1, T2 if they are open during normal operation.

After a delay, the electro-mechanical bypass switch S1 starts to lift its movable switching contact 15 from the fixed switching contact 14 at time point t2 causing a switching arc burning between the same. At this time point t2, the current Ia and Ib has increased up to the current level I1 and the voltage U across the fixed switching contact 14 and the movable switching contact 15 of the electro-mechanical bypass switch S1 has increased up to the voltage level U1, which usually is <1 V. The generated switching arc causes a further increase of the voltage U up to voltage level U2, which for instance is about 12 V per contact pair (of course, the arc voltage depends on contact geometry, current density, material type, etc.). If the electro-mechanical bypass switch S1 comprises two contact pairs, the (total) arc voltage is about 24 V, and so on. This voltage level U2 is high enough to get the transistors T1, T2 and the rectifier D1 . . . D4 conductive (note that the transistors T1, T2 have been turned on short after time point t1, if they were turned off during normal operation).

In turn, the current Ib over the electro-mechanical bypass switch S1 commutates over to the semiconductor circuit 5 from the time point t2 to the time point t3. So, as the current Ib over the electro-mechanical bypass switch S1 decreases, the current Ic over the semiconductor circuit 5 increases in the same way. It should be noted at this point that it takes just a few microseconds from the time point t2 to the time point t3.

At time point t3, this transfer is completed, and the semiconductor circuit 5 carries the whole current Ia, meaning Ic=Ia. During commutation, the current Ia flowing over the input connectors 2a, 2b rises up to the current level 12. The voltage U across the fixed switching contact 14 and the movable switching contact 15 of the electro-mechanical bypass switch S1 drops down now to the forward voltage of the transistors T1, T2 and the rectifier D1 . . . D4. However, the current Ic still increases as the transistors T1, T2 are still in their ON state.

At time point t4, the transistors T1, T2 are finally switched off so that the current Ic flowing over the semiconductor circuit 5 drops to zero. As a consequence, the current commutates over to the snubber circuit R1, C, D5 and to the varistor R2, meaning Id=Ia. In particular, t4<450 μs.

Until the time point t5 the voltage U across the fixed switching contact 14 and the movable switching contact 15 of the electro-mechanical bypass switch S1 rises up to a peak voltage U4, which depends on the voltage at the varistor R2. For instance, the peak voltage U4 is in the range of 1000 V at a varistor voltage of 380 VDC or in the range of 1600 V at a varistor voltage of 700 VDC. The current Ia over the input connectors 2a, 2b decreases until it becomes zero at time point t6. Short before the time point t6, the voltage U across the fixed switching contact 14 and the movable switching contact 15 of the electro-mechanical bypass switch S1 drops down to a voltage level U3, which corresponds to the line voltage, i.e. the voltage of the voltage source VP.

It should be noted, that the transistors T1, T2 may not be switched off before the air gap between the fixed switching contact 14 and the movable switching contact 15 of the electro-mechanical bypass switch S1 is large enough and the ionization state of air between the contacts is low enough to carry the peak voltage U4 without risking re-ignition of an arc between the fixed switching contact 14 and the movable switching contact 15 of the electro-mechanical bypass switch S1. In other words, the dielectric strength between the fixed switching contact 14 and the movable switching contact 15 shall be large enough before the transistors T1, T2 are switched off.

So, it is not only the commutation time (t3–t2), which influences the current level 13, but also the time which is necessary to have a sufficiently large dielectric strength between the fixed switching contact 14 and the movable switching contact 15 of the electro-mechanical bypass switch S1. This condition is reached at time point t4 or short before in the above example (note that the arc voltage is about just 12 V per contact pair).

Do also note that in the fifth diagram of FIG. 6 the alternation of the line voltage is not visible since the time span between t0-t6 is very short and particularly in the range of 1 ms. Thus, the time span between t0-t6 is short in respect of the period of the voltage of the voltage source VP at a typical frequency of 50 Hz or 60 Hz, which then is 20 ms or 16.6 ms. Accordingly, the line voltage is quasi constant during the time span between t0-t6.

If the line voltage is an alternating voltage or if bidirectional current flow shall be provided for a DC line voltage, the hybrid circuit breaker 1 is prepared for bi-directional currents. For this reason, the rectifier D1.D4 provides a rectified voltage to the transistors T1, T2. Alternatively, also the transistors T1, T2 may be switched in opposite directions. For this reason, and because of the body diodes of the MOSFETs used in this example for the electronic bypass switches S2a, S2b, the same are switched in anti-series. Alternatively, a single device may be used instead of the anti-series electronic bypass switches S2a, S2b If it allows for bi-directional currents.

The switches S3, S4 have no special function in an over current situation. They are added to the hybrid circuit breaker 1 to provide a galvanic separation. They have a large contact distance (>3 mm) but do not need to switch very fast. Nevertheless, they may also be opened by the control unit CTRL in case of an electrical fault 9. If so, the switches S3, S4 are preferably opened, when the current Id is zero or almost zero. Hence, the switches S3, S4 are opened after the time point t6 or short before.

As shown in the second diagram of FIG. 6, the transistors T1, T2 have to carry the higher part of the fault currents. Accordingly, the semiconductor circuit 5 is made comparably robust and thus large in traditional designs. The semiconductor circuit 5 may also be cooled, which however is technically challenging because of the short time, in which the electrical energy is forced into the semiconductor circuit 5.

Surprisingly, the electrical stress on the semiconductor circuit 5 and the temperature of the semiconductor circuit 5 can also be kept low if mainly or only the electro-mechanical bypass switch S1 is cooled. The reason for this surprising effect are the movable parts of the electro-mechanical bypass switch S1 (see the contact piece 12 with the movable switching contact 15 in FIG. 2). Cooling the electro-mechanical bypass switch S1 or at least its movable parts allows for lower cross sections of the conductors in the electro-mechanical bypass switch S1. In this way, the weight and—even more important—the inertia of the contact piece 12 can be reduced. In turn the contact piece 12 is moved faster and the movable switching contact 15 is lifted from the fixed switching contact 14 faster, too.

It becomes clear out of FIG. 6 that the commutation time of the electro-mechanical bypass switch S1 (*t3–t2*) and even more the safe air gap time (≈t4) substantially influences the level of current I, which the electro-mechanical bypass switch S1 has to carry in case of fault, and also the current level I, which the transistors T1, T2 and other elements like cables, fuses, etc. have to carry in case of fault.

By reducing particularly, the safe air gap time (≈t4), the electrical energy forced into the semiconductor circuit 5 and converted there in heat energy can substantially be reduced. It is also of particular advantage that the electrical power kept away from the semiconductor circuit 5 caused by the faster electro-mechanical bypass switch S1 is much higher than the power of the cooling device F, 17. In other words, advantage is taken of the leverage effect between cooling the electro-mechanical bypass switch S1 and the multiplied effect on the semiconductor circuit 5. Just a small cooling device F, 17 with low power is needed for this large effect.

Cooling the semiconductor circuit 5 without cooling the electro-mechanical bypass switch S1 would need much higher cooling power and much larger cooling devices and would be much more complicated for the same effect. Cooling of the semiconductor circuit 5 would have to happen close to the junction of the semiconductor parts of the semiconductor circuit 5 to be effective because of the short time, in which the semiconductor circuit 5 effectively conducts a current. In fact, the duration of this time span t2-t4 is just a few 100 μs.

But by use of the cooling device F, 17, the semiconductor circuit 5 can be made comparably small without any further cooling. In turn, the hybrid circuit breaker 1 as such can be made smaller and cheaper than in prior art since the semiconductor circuit 5 has a substantial share on the size (i.e. on the volume) of the semiconductor circuit 5 and also a substantial share on the costs for the hybrid circuit breaker 1.

The very same counts for the varistor R2 and the snubber circuit 6, which comprises the snubber resistor R1, the snubber capacitor C and the snubber diode D5. The longer it takes to reach the safe air gap, the higher the current and the energy is, which the varistor R2 and the snubber circuit 6 have to withstand. Accordingly, also the size of the varistor R2 and the size of the snubber circuit 6 substantially increases with the time to reach the safe air gap.

But size of the semiconductor circuit 5 and of the varistor R2 is not only about costs. The reduced size of the of the semiconductor circuit 5 moreover positively influences the loop inductance of the hybrid circuit breaker 1 and in turn reduces the commutation time (t3-t2) of the fault current from the electro-mechanical bypass switch S1 into the semiconductor circuit 5. This effect is explained by use of FIG. 7 below.

Figure 7:
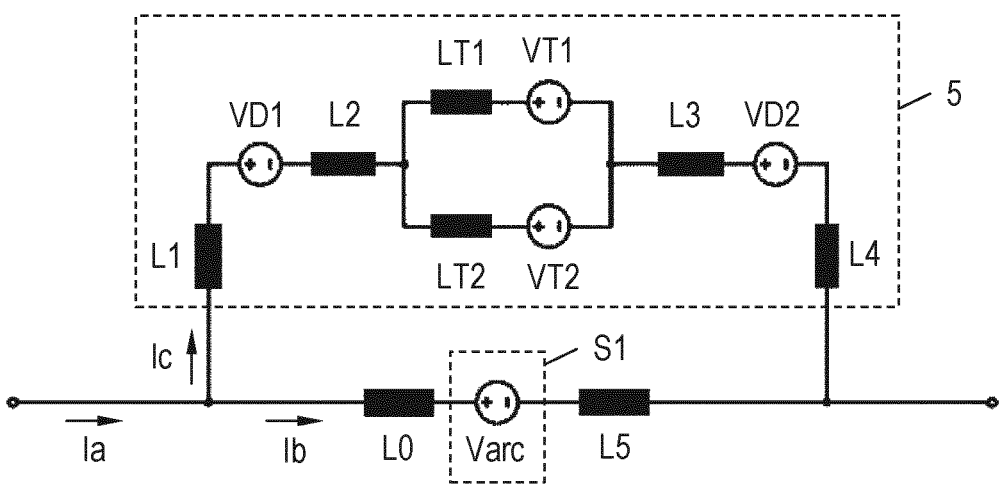
FIG. 7 shows a simplified equivalent circuit of a cut out of the hybrid circuit breaker.

FIG. 7 shows a simplified equivalent circuit of a cut out of the hybrid circuit breaker 1 shown in FIG. 1 for the first embodiment without electronic bypass switches S2a, S2b, but with a switching arc. In detail, FIG. 7 shows a first voltage source VT1 for the first transistor T1, a second voltage source VT2 for the second transistor T2, two further voltage sources VD1 and VD2 for the diodes D1 and D2 of the rectifier and finally a voltage source Varc for the arc burning between the fixed switching contact 14 and the movable switching contact 15 of the electro-mechanical bypass switch S1. Between the voltage sources VT1, VT2, VD1, VD2 and Varc there are inductances L0 . . . L5 and LT1, LT2 representing the inductances of the lines between the first transistor T1, the second transistor T2, the diodes D1 and D2 of the rectifier and the electro-mechanical bypass switch S1. Finally, FIG. 7 shows the currents Ia, lb and Ic. The formulas below show the relations between the above parameters.

$$Ia = Ib + Ic$$

$$V_{semi} = VD1 + VD2 + VT$$

$$L_{loop} = \sum_{i=0}^{i=5} Li + \frac{LT}{2}$$

$$t_{comm} = \frac{L_{loop}}{V_{arc} - V_{semi}} \cdot Ia$$

So, it is understandable based on the above formulas that the loop inductance Loop substantially influences the commutation time $t_{comm}=(t3–t2)$. Smaller semiconductors also have a lower internal resistance thus lowering the voltage $V_{semi}$ of the semiconductor circuit 5.

Cooling (just) the electro-mechanical bypass switch S1 with the cooling device F, 17 inter alia enables:

a reduction of the loop inductance $L_{loop}$, a reduction of the (forward) voltage $V_{semi}$ of the semiconductor circuit 5 and based on the above effects a reduction of the commutation time $t_{comm}$ (t3–t2)

and a reduction of the current level 12, a reduction of time until a save air gap is achieved between the fixed switching contact 14 and the movable switching contact 15 of the electro-mechanical bypass switch S1 (t4–t2), based on the above effect a reduction of the current level 13, a reduction of the amount of energy forced into the semiconductor circuit 5 and a reduction of thermal and electrical stress semiconductor circuit 5.

Reduced current commutation time $t_{comm}$ (t3–t2) also means less detrimental effect of the switching arc on the fixed switching contact 14 and the movable switching contact 15 of the electro-mechanical bypass switch S1. In other words, the proposed measures allow for higher currents without shortening the lifetime of the hybrid circuit breaker 1.

So, the cooling device F, 17 has multiple effects on the energy forced into the semiconductor circuit 5.

2) Hybrid Circuit Breaker 1 with Electronic Bypass Switches S2A, S2B:

The behavior of this hybrid circuit breaker 1 is similar to that one of the hybrid circuit breaker 1 of the first embodiment, but however not identical.

During normal operation, the electro-mechanical bypass switch S1, the switches S3, S4, the additionally the electronic bypass switches S2a, S2b and (optionally) the transistors T1, T2 are in their ON-state thus connecting the input connector 2a and the output connectors 3a and allowing a current flow over the current paths 4a, 4b. Note that electronic bypass switches S2a, S2b with a very low on-state resistance are used to reduce power losses of the hybrid circuit breaker 1 during normal operation.

Again, it is assumed that at time point t0 an electrical fault 9 occurs and again as a consequence the first current Ia rises as this is depicted in the first diagram of FIG. 6.

At time point t1, the control unit CTRL detects the over current situation by monitoring the voltage across the shunt R3 and in turn sends an OPEN command to the electro-mechanical bypass switch S1 and also to the electronic bypass switches S2a, S2b. In addition, the control unit CTRL sends a CLOSE command to the transistors T1, T2 if they are open during normal operation.

After a short delay but faster than the electro-mechanical bypass switch S1, the electronic bypass switches S2a, S2b cut off the current over the current path 4a. Then, the electro-mechanical bypass switch S1 starts to lift its movable switching contact 15 from the fixed switching contact 14 at the time point t2. Because the electronic bypass switches S2a, S2b are already open, no switching arc now burns between the fixed switching contact 14 and the movable switching contact 15 of the electro-mechanical bypass switch S1.

Nevertheless, the transistors T1, T2 may not be switched off at this point in time, because the electronic bypass switches S2a, S2b would be destroyed by the peak voltage U4. The reason is that the electronic bypass switches S2a, S2b with a very low on-state resistance have a very low breakdown voltage which, for instance, is in the range of 30

V whereas the peak voltage U4 rises up to some hundred or even 1000 V. So, the transistors T1, T2 may not be switched off before the air gap between the fixed switching contact 14 and the movable switching contact 15 of the electro-mechanical bypass switch S1 is large enough to carry the peak voltage U4 without risking a flashover between the fixed switching contact 14 and the movable switching contact 15 of the electro-mechanical bypass switch S1 and an arc burning between the same. In this case, the voltage between fixed switching contact 14 and the movable switching contact 15 would drop down to the arc voltage (about 12 V) causing the voltage over the electronic bypass switches S2a, S2b rise up to nearly the peak voltage U4 what would without doubt destroy the electronic bypass switches S2a, S2b. So, again the full opening time t4-t2 of the electro-mechanical bypass switch S1 is essential for the current level 13, which the semiconductor circuit 5 has to withstand.

Nevertheless, the electronic bypass switches S2a, S2b have a positive effect. Because the current Ib already commutates to the semiconductor circuit 5 before the movement of the movable switching contact 15 of the electro-mechanical bypass switch S1 (i.e. without movement of the contact piece 12), no arc burns between the fixed switching contact 14 and the movable switching contact 15 of the electro-mechanical bypass switch S1. Accordingly, life time of the electro-mechanical bypass S1 switch is increased. The fixed switching contact 14 and the movable switching contact 15 can also be more optimized in terms of their resistance and should be less thermally stable.

In addition, a safe air gap between the fixed switching contact 14 and the movable switching contact 15 of the electro-mechanical bypass switch S1 is reached faster. The reason is that there is no arc-plasma between the fixed switching contact 14 and the movable switching contact 15 of the electro-mechanical bypass switch S1 reducing isolation capability of the air gap because of the absent switching arc. In other words, the electronic bypass switches S2a, S2b reduce the full opening time t4-t2 of the electro-mechanical bypass switch S1 because the movable switching contact 15 does not need to move so far. But still, the semiconductor circuit 5 should not cut off the current unless the air gap between fixed switching contact 14 and the movable switching contact 15 is large enough to withstand the peak voltage U4 caused by the semiconductor circuit 5 without risking a flashover between the fixed switching contact 14 and the movable switching contact 15 since such a flashover would cause an avalanche breakdown of the electronic bypass switches S2a, S2b.

So, by use of the electronic bypass switches S2a, S2b, both the load of the electro-mechanical bypass switch S1 and the semiconductor circuit 5 can be reduced. In this case, the current Ia is commutated to the semiconductor circuit 5 lower current levels than in case of a hybrid circuit breaker 1 without the electronic bypass switches S2a, S2b.

Notwithstanding the above disclosure, it should be noted that the electronic bypass switches S2a, S2b are optional for the disclosed hybrid circuit breaker 1 and can be omitted.

It is advantageous for embodiments if the electro-mechanical bypass switch S1 is a multi-contact pair switch. In particular, the electro-mechanical bypass switch S1 can comprise two contact pairs, i.e. two pairs of fixed switching contacts 14 and the movable switching contacts 15. Nevertheless, electro-mechanical bypass switch S1 of FIG. 1 may have a different number of contact pairs, for example it may comprise just one contact pair (as shown in the FIGS. 2 to 5) or even more than two contact pairs. By use of the multiple contact pairs, multiple arcs with multiple arc voltages Varc are generated simultaneously or almost simultaneously what reduces the commutation time (t3–t2).

In embodiments, the thermal coupling between the cooling device F, 17 and the electro-mechanical bypass switch 1 can be higher than a thermal coupling between the cooling device F, 17 and the semiconductor circuit 5. That does not necessarily mean that the semiconductor circuit 5 is not cooled by the cooling device F, 17 at all, but cooling is concentrated to the electro-mechanical bypass switch 1. It should also be noted that the basic intention is not about cooling a massive switching arc (if there is any at all), but about cooling the current drawing metal parts of the electro-mechanical bypass switch 1. Cooling a switching arc may happen, but this is just a side effect.

The electro-mechanical bypass switch 1 in particular can embodied as a "high speed" electro-mechanical bypass switch with a switching time (time span t1-t4)≤400 µs. After said switching time, the gap between the fixed switching contact 14 and the movable switching contact 15 is sufficiently large to withstand the peak voltage U4. This condition is reached for U4=1000 V at a total contact gap of 1.2 mm for the first embodiment (hybrid circuit breaker 1 without electronic bypass switches S2*a*, S2*b*) and a total contact gap of 0.15 mm for the second embodiment (hybrid circuit breaker 1 with electronic bypass switches S2*a*, S2*b*). The reason for the different gap values is that in the first embodiment the ionized air in the contact gap is more conductive because of the switching arc than the "cold" air in the second embodiment (remember that there is no switching arc in the second embodiment). In a more preferred embodiment the switching time (time span t1-t4) is even ≤400 µs. In particular if a "high speed" electro-mechanical bypass switch S1 is used for the hybrid circuit breaker 1, a cooling for the semiconductor circuit 5 may be omitted. In other words, a thermal coupling between the active cooling device F, 17 and the semiconductor circuit 5 may be <0.01 times the thermal coupling between the active cooling device F, 17 and the electro-mechanical bypass switch S1. It should be noted that the above referenced contact gap refers to the total gap, which in the case of a double contact pair is twice the (single) contact gap.

In particular because of the above reasons, it is of advantage if the cooling device F, 17 is capable of generating:

a heat flow when the electro-mechanical bypass switch S1 is closed and/or a heat flow >90% of the operating time of the hybrid circuit breaker 1; or a flow of a cooling fluid when the electro-mechanical bypass switch S1 is closed and/or a flow of a cooling fluid >90% of the operating time of the hybrid circuit breaker 1.

Furthermore, it is of advantage if the cooling device F, 17 is in its on-state:

at least in a current range reaching from 90% to 100% of a tripping current of the hybrid circuit breaker 1; or at least in a current range reaching from a nominal current of the hybrid circuit breaker 1 to a tripping current of the hybrid circuit breaker 1.

The above range may include or exclude the tripping current.

In a simple and robust embodiment, the cooling device F, 17 is simply connected to a power source and runs all the time.

Nevertheless, the cooling control CTC can be operatively connected to the cooling device F, 17 to cool the electro-mechanical bypass S1 when the electro-mechanical bypass S1 switch is closed and/or >90% of the operating time of the hybrid circuit breaker 1. In other words, the cooling device F, 17 is in its on-state or switched on when the electro-mechanical bypass switch S1 is closed and/or >90% of the operating time of the hybrid circuit breaker.

The cooling control CTC may also be prepared to switch on the active cooling device F, 17 at least in a current range reaching from 90% to 100% of a tripping current of the hybrid circuit breaker 1 or at least in a current range reaching from a nominal current of the hybrid circuit breaker 1 to a tripping current of the hybrid circuit breaker 1. The above range may include or exclude the tripping current.

In these ways, the electro-mechanical bypass switch S1 is held in good condition for a possible switching or tripping event.

As already disclosed above, advantageously an air stream caused by the fan F is not only guided over the contact piece 12 and the movable switching contact 15, but also over the fixed switching contact 14. In this way, burn-off material-loss can be blown away from the fixed switching contact 14 and the movable switching contact 15 thus increasing the life span of the electro-mechanical bypass switch S1. To improve this effect, it is also of particular advantage if the cooling control CTC increases an air stream of the fan F before the fixed switching contact 14 and the movable switching contact 15 of electro-mechanical bypass switch S1 are closed. It should also be noted that the fan F needs not to be stopped during a switching arc event, but it may also (but not only) run when a switching arc occurs.

Again, it should be noted that the invention does not focus on cooling a switching arc, but on cooling the movable parts 12, 15 of an electro-mechanical bypass switch S1. Generally, the cooling power of the proposed cooling devices F, 17 is much too low to substantially cool a switching arc. The power of the switching arc is in the region of some hundred Watts, whereas cooling power is in the region of some Watts. Generally, a temperature reduction of the switching arc is <5 C. If the space, which the movable contact piece 12, the fixed switching contact 14 and the movable switching contact 15 are built in, is a capsuled space, cooling the switching arc is not possible at all.

By application of the disclosed features, various hybrid circuit breakers 1 of a type series or group of hybrid circuit breakers 1 having different nominal current capacities can be provided. In particular, hybrid circuit breakers 1 having different nominal current capacities may comprise electro-mechanical bypass switches S1 of the same type and/or semiconductor circuits 5 of the same type.

For example, a first hybrid circuit breaker 1 with a first nominal current capacity and/or a first current-time characteristics can comprise a cooling device F, 17, whereas a second hybrid circuit breaker 1 with a second nominal current capacity below said first nominal current capacity and/or a second current-time characteristics, which is less robust than the first current-time characteristics, does not comprise a cooling device F, 17, although the mechanical bypass switches S1 and/or the semiconductor circuits 5 may be of the same type for both hybrid circuit breakers 1.

Generally, a cooling power Pc of the active cooling device F, 17 can be increased by the cooling control CTC when the current Ib over the electro-mechanical bypass switch S1, which is measured by means of the shunt R3, increases and/or when the current-time characteristics changes over to more robust ones. In this way, the cooling power is adapted to changing demands, and the electro-mechanical bypass switch S1 is held in good condition for a switch-off event.

Figure 8:
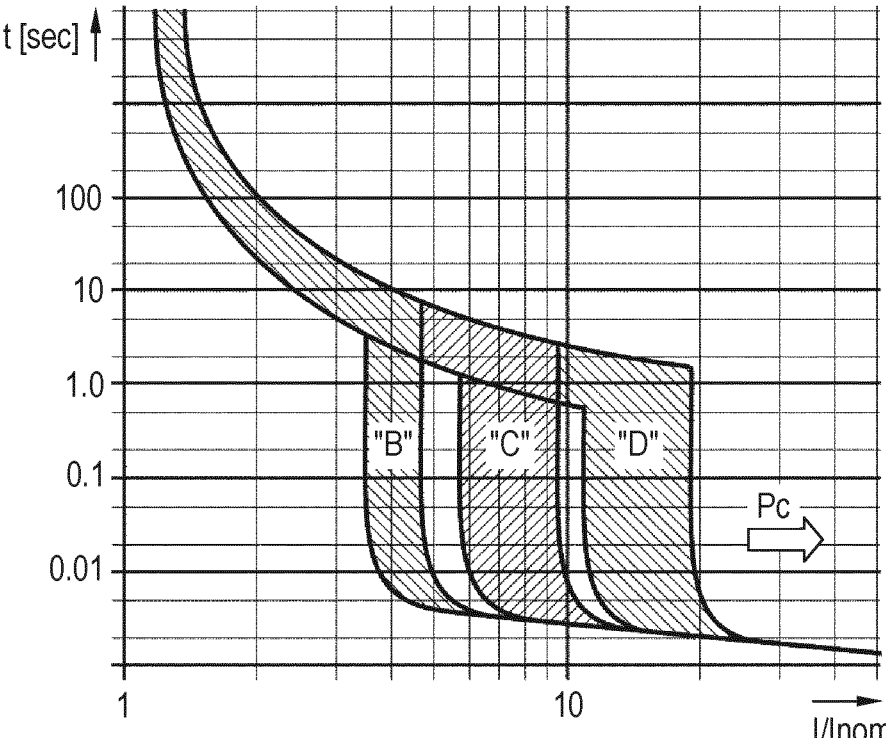
FIG. 8 shows current-time characteristics or tripping characteristics of a hybrid circuit breaker.

In the above context, FIG. 8 shows typical current-time characteristics or tripping characteristics of a hybrid circuit breaker 1. In detail, the tripping time t over the ratio of the current I divided by the nominal current I/Inom is shown for a type "B" circuit breaker (standard), a type "C" circuit breaker (raised inrush current) and a type "D" circuit breaker (high capacitive or inductive load). As indicated by an arrow, cooling power Pc is the higher the more robust the tripping characteristics of the hybrid circuit breaker 1 is or the higher the current I or Ib is.

In one embodiment, one and the same hybrid circuit breaker 1 provides a variety of current-time characteristics or tripping characteristics, which may be chosen in a setup procedure. For instance, one of an "B"-type, "C"-type or "D"-type characteristics may be chosen. Accordingly, cooling power may be increased when there is a changeover from "B"-type to "C"-type or from "C"-type to "D"-type and vice versa.

In another embodiment, different current-time characteristics are provided by different hybrid circuit breakers 1 with electro-mechanical bypass switches S1 of the same type and/or semiconductor circuits 5 of the same type and with cooling devices F, 17 of different types or with cooling devices F, 17 of the same type running at different power levels Pc.

Generally, cooling power Pc may be varied continuously or in steps. Preferably, cooling power Pc changes continuously in accordance with a current Ib over the electro-mechanical bypass switch S1 and/or changes in steps in accordance with different current-time characteristics.

On the grounds presented hereinbefore, one and the same mechanical bypass switch S1 and/or one and the same semiconductor circuit 5 may carry a much higher current Ia just because a small cooling device F, 17 is attached to the mechanical bypass switch S1 of the first hybrid circuit breaker 1. Moreover, housings for hybrid circuit breakers 1 having a different nominal current can have the same outer dimensions.

In this way, offering a type series or group of hybrid circuit breakers 1 is much easier and much cheaper than in prior art because just a small number of different parts is needed for a big variety of nominal currents Ia.

The various hybrid circuit breakers 1 of the type series or group can comprise cooling devices F, 17 of different types or cooling devices F, 17 of the same type.

By the presented measures, the hybrid circuit breaker 1, in particular the semiconductor circuit 5, can withstand higher currents than in prior art without increasing its size and its costs. Accordingly, hybrid circuit breakers 1 for high nominal currents can be made smaller and cheaper than before. Advantage is taken of the leverage effect between cooling the electro-mechanical bypass switch S1 and the multiplied effect on the semiconductor circuit 5. Just a low cooling power and thus just a small cooling device F, 17 needed for a large effect. Cooling the semiconductor circuit 5 without cooling the electro-mechanical bypass switch S1 would need much higher cooling power and much larger cooling devices for the same effect.

It should be noted in this context that double nominal current in prior art means four times the electrical energy and hence four times the size and four times the costs for the semiconductor circuit 5 and serious problems at the varistor R2. By use of the cooling device F, 17, this law can be undermined.

Advantageously:

$$A < n \cdot \frac{0.25 \cdot I_{cu}}{di}$$

wherein A is an active chip area of the semiconductor circuit 5 in cm², n is the number of power switching elements (e.g. diodes, transistors, thyristors, etc.) in the semiconductor circuit 5, $I_{cu}$ is a short circuit current switching capacity of the hybrid circuit 1 breaker in Ampere and di is the current density of a single power switching element in A/cm². In case of FIG. 1 the semiconductor circuit 5 comprises five non-controlled power switching elements D1 . . . D5 and one controlled power switching element, which is embodied by two parallel thyristors T1, T2. For a typical current density of di=150 A/cm² for a silicon technology and a typical short circuit current switching capacity $I_{cu}$=20 kA this particularly means:

$$A < 6 \cdot \frac{0.25 \cdot 20.000}{150}$$

$$A < 200.0 \ \text{cm}^2$$

Furthermore it is of advantage if:

$$V < \frac{2.54 \cdot 10^{-2} [HA] \cdot I_{cu}}{dE}$$

wherein V is a volume of the varistor R2 switched in parallel with the electro-mechanical bypass switch 1 in cm³, is a short circuit current switching capacity of the hybrid circuit breaker 1 in Ampere and dE is the energy density of the varistor R2 in J/cm³, wherein the energy density dE refers to an effective volume of the varistor R2. For a typical energy density dE=250 J/cm³ for a metal oxide material and a typical short circuit current switching capacity $I_{cu}$=20 kA this particularly means:

$$V < \frac{2.54 \cdot 10^{-2} [HA] \cdot 20.000}{250}$$

$$V < 2.03 \ \text{cm}^3$$

Finally, It should also be noted that the term "comprising" does not exclude other elements and the use of articles "a" or "an" does not exclude a plurality. Also elements described in association with different embodiments may be combined. It should also be noted that reference signs in the claims should not be construed as limiting the scope of the claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 hybrid circuit breaker
2a, 2b input connector
3a, 3b output connector
4a, 4b current path
5 semiconductor circuit
6 snubber circuit
7, 7a . . . 7c bypass device
8 load
9 electric fault
10a, 10b terminal
11 base body
12 movable contact piece
13 actuator
14 fixed switching contact
15 movable switching contact
16a, 16b outlet
17 heat exchanger
18a, 18b connector
19 recess
C snubber capacitor
CTC cooling control
CTRL control unit
D1 . . . D4 rectifier
D5 snubber diode
F fan
I1 . . . I3 current level
Ia . . . Id current
Inom nominal current
L grid inductance
L0 . . . L5 line inductance
Pc cooling power
LT1, LT2 inductances of the transistors T1 and T2
R1 snubber resistor
R2 varistor
R3 shunt
R4 grid resistance
S1 electro-mechanical bypass switch
S2a, S2b electronic bypass switch (MOSFET)
t time
t0 . . . t6 time point
T1, T2 transistor (IGBT)
U voltage
U1 . . . U4 voltage level
VP voltage source
Varc voltage source for an arc in the electro-mechanical bypass switch S1
VD1, VD2 voltage sources for the diodes D1 and D2 of the rectifier
VT1 voltage source for the first transistor T1
VT2 voltage source for the second transistor T2

The invention claimed is:

1. A hybrid circuit breaker, the hybrid circuit breaker comprising:
   input connectors configured to receive electrical energy from a power grid;
   output connectors configured to transfer electrical energy to a load;
   current paths, each connecting a respective input connector, of the input connectors, and a respective output connector, of the output connectors;
   an electro-mechanical bypass switch in at least one of the current paths;
   a semiconductor circuit in parallel with the electro-mechanical bypass switch;
   a controller configured to control a commutation from the at least one current path in which the electro-mechanical bypass switch is arranged to the semiconductor circuit in a switching operation; and
   an active cooling device in a direct vicinity of the electro-mechanical bypass switch, the active cooling device being adapted to cool movable parts of the electro-mechanical bypass switch,
   wherein the hybrid circuit breaker is configured to satisfy:

$$A < n \cdot \frac{0.25 \cdot I_{cu}}{di}$$

wherein A is an active chip area of the semiconductor circuit in $cm^2$, n is a number of power switching elements in the semiconductor circuit, $I_{cu}$ is a short circuit current switching capacity of the hybrid circuit breaker in Ampere, and di is a current density of a single power switching element in $A/cm^2$.

2. The hybrid circuit breaker according to claim 1, wherein the active cooling device comprises a fan, and
   wherein the hybrid circuit breaker comprises air ducts configured to guide an air stream caused by the fan over a fixed switching contact and a movable switching contact of the electro-mechanical bypass switch.

3. The hybrid circuit breaker according to claim 1, wherein a varistor is switched in parallel with the electro-mechanical bypass switch, and
   wherein the hybrid circuit breaker is configured to satisfy:

$$V < \frac{2.54 \cdot 10^{-2} [HA] \cdot I_{cu}}{dE}$$

wherein V is a volume of the varistor in $cm^3$, $I_{cu}$ is a short circuit current switching capacity of the hybrid circuit breaker in Ampere, and dE is an energy density of the varistor in $J/cm^3$, wherein the energy density dE refers to an effective volume of the varistor.

4. The hybrid circuit breaker according to claim 1, wherein the active cooling device comprises a fan placed in a direct vicinity of a fixed switching contact and a movable switching contact of the electro-mechanical bypass switch.

5. The hybrid circuit breaker according to claim 4, wherein the active cooling device is arranged such that a distance between the fan and the movable switching contact of the electro-mechanical bypass switch is less than 20 mm and is configured to guide an air stream of the fan directly over the movable switching contact.

6. The hybrid circuit breaker according to claim 5, wherein the active cooling device includes a housing and the electro-mechanical bypass switch includes a base body, and wherein the housing is attached to the base body such that the housing and base body together direct the air stream of the active cooling device over the movable switching part.

7. A method for operating a hybrid circuit breaker, the hybrid circuit breaker comprising:

input connectors configured to receive electrical energy from a power grid;

output connectors configured to transfer electrical energy to a load;

current paths each connecting a respective input connector, of the input connectors, and a respective output connector, of the output connectors;

an electro-mechanical bypass switch in at least one of the current paths;

a semiconductor circuit in parallel with the electro-mechanical bypass switch;

a controller configured to control a commutation from the at least one current path, in which the electro-mechanical bypass switch is arranged, to the semiconductor circuit in case of a switching operation; and an active cooling device arranged in a direct vicinity of the electro-mechanical bypass switch, the method comprising:

operating the active cooling device to actively cool movable parts of the electro-mechanical bypass switch, wherein the hybrid circuit breaker is configured to satisfy:

$$A < n \cdot 0.25 \cdot I_{cu}/di$$

wherein A is an active chip area of the semiconductor circuit in $cm^2$, n is a number of power switching elements in the semiconductor circuit, $I_{cu}$ is a short circuit current switching capacity of the hybrid circuit breaker in Ampere, and di is a current density of a single power switching element in $A/cm^2$.

8. The method as claimed in claim 7, wherein a thermal coupling between the active cooling device and the electro-mechanical bypass switch is higher than a thermal coupling between the active cooling device and the semiconductor circuit.

9. The method as claimed in claim 7, wherein the active cooling device of the hybrid circuit breaker is in its on-state when the electro-mechanical bypass switch is closed.

10. The method as claimed according to claim 7 wherein the active cooling device is in its on-state >90% of the operating time of the hybrid circuit breaker.

11. The method as claimed according to claim 7, wherein the active cooling device generates a flow of a cooling fluid when the electro-mechanical bypass switch is closed and/or >90% of the operating time of the hybrid circuit breaker.

12. The method as claimed according to claim 7, wherein the active cooling device is in its on-state at least in a current range reaching from 90% to 100% of a tripping current of the hybrid circuit breaker.

13. The method as claimed according to claim 7, wherein the active cooling device is in its on-state at least in a current range reaching from a nominal current of the hybrid circuit breaker to a tripping current of the hybrid circuit breaker.

14. The method as claimed according to claim 7, wherein a cooling power of the active cooling device is increased when a current over the electro-mechanical bypass switch increases and/or when current-time characteristics change over to more robust ones.

15. The method as claimed according to claim 7, wherein an air stream of the active cooling device, which comprises a fan, is increased before the electro-mechanical bypass switch is closed.

16. The method as claimed according to claim 7, wherein a time span between a time point, at which an electrical fault occurs, and a time point, at which a current flowing over the semiconductor circuit drops to zero, is <450 μs.

17. A hybrid circuit breaker, the hybrid circuit breaker comprising:

input connectors configured to receive electrical energy from a power grid;

output connectors configured to transfer electrical energy to a load;

current paths, each connecting a respective input connector, of the input connectors, and a respective output connector, of the output connectors;

an electro-mechanical bypass switch in at least one of the current paths;

a semiconductor circuit in parallel with the electro-mechanical bypass switch;

a controller configured to control a commutation from the at least one current path in which the electro-mechanical bypass switch is arranged to the semiconductor circuit in a switching operation; and an active cooling device in a direct vicinity of the electro-mechanical bypass switch, the active cooling device being adapted to cool movable parts of the electro-mechanical bypass switch, wherein the active cooling device comprises a fan placed in a direct vicinity of a fixed switching contact and a movable switching contact of the electro-mechanical bypass switch, wherein the active cooling device is arranged such that a distance between the fan and the movable switching contact of the electro-mechanical bypass switch is less than 20 mm and is configured to guide an air stream of the fan directly over the movable switching contact, and wherein the active cooling device includes a housing and the electro-mechanical bypass switch includes a base body, and wherein the housing is attached to the base body such that the housing and base body together direct the air stream of the active cooling device over the movable switching part.

* * * * *